United States Patent
Ferguson et al.

(10) Patent No.: US 9,248,834 B1
(45) Date of Patent: Feb. 2, 2016

(54) PREDICTING TRAJECTORIES OF OBJECTS BASED ON CONTEXTUAL INFORMATION

(71) Applicant: Google Inc., Mountain View, CA (US)

(72) Inventors: David Ian Franklin Ferguson, San Francisco, CA (US); David Harrison Silver, Millbrae, CA (US); Stéphane Ross, Mountain View, CA (US); Nathaniel Fairfield, Mountain View, CA (US); Ioan-Alexandru Sucan, Mountain View, CA (US)

(73) Assignee: Google Inc., Mountain View, CA (US)

( * ) Notice: Subject to any disclaimer, the term of this patent is extended or adjusted under 35 U.S.C. 154(b) by 61 days.

(21) Appl. No.: 14/505,007

(22) Filed: Oct. 2, 2014

(51) Int. Cl.
G08G 1/16 (2006.01)
B60W 30/09 (2012.01)

(52) U.S. Cl.
CPC .......... *B60W 30/09* (2013.01); *B60W 2550/10* (2013.01)

(58) Field of Classification Search
USPC ....................................................... 701/301
See application file for complete search history.

(56) References Cited

U.S. PATENT DOCUMENTS

| | | | |
|---|---|---|---|
| 1,924,984 A | 8/1933 | Fageol | |
| 3,186,508 A | 6/1965 | Lamont | |
| 3,324,805 A | 6/1967 | Mulch | |
| 3,596,728 A | 8/1971 | Neville | |
| 4,372,414 A | 2/1983 | Anderson et al. | |
| 4,387,783 A | 6/1983 | Carman | |
| 4,656,834 A | 4/1987 | Elpern | |
| 4,924,795 A | 5/1990 | Ottemann | |
| 4,970,653 A | 11/1990 | Kenue | |
| 4,982,072 A | 1/1991 | Takigami | |
| 5,187,666 A | 2/1993 | Watanabe | |
| 5,415,468 A | 5/1995 | Latarnik et al. | |

(Continued)

FOREIGN PATENT DOCUMENTS

| | | |
|---|---|---|
| CN | 101073018 A | 11/2007 |
| CN | 101364111 A | 2/2009 |

(Continued)

OTHER PUBLICATIONS

Chinese Office Action for Application No. 201180057954.0 dated Apr. 29, 2015.

(Continued)

*Primary Examiner* — Thomas Tarcza
*Assistant Examiner* — Alex C Dunn
(74) *Attorney, Agent, or Firm* — Lerner, David, Littenberg, Krumholz & Mentlik, LLP

(57) ABSTRACT

Aspects of the disclosure relate to detecting and responding to objects in a vehicle's environment. For example, an object may be identified in a vehicle's environment, the object having a heading and location. A set of possible actions for the object may be generated using map information describing the vehicle's environment and the heading and location of the object. A set of possible future trajectories of the object may be generated based on the set of possible actions. A likelihood value of each trajectory of the set of possible future trajectories may be determined based on contextual information including a status of the detected object. A final future trajectory is determined based on the determined likelihood value for each trajectory of the set of possible future trajectories. The vehicle is then maneuvered in order to avoid the final future trajectory and the object.

20 Claims, 14 Drawing Sheets

(56) References Cited

U.S. PATENT DOCUMENTS

| | | |
|---|---|---|
| 5,448,487 A | 9/1995 | Arai |
| 5,470,134 A | 11/1995 | Toepfer et al. |
| 5,684,696 A | 11/1997 | Rao et al. |
| 5,774,069 A | 6/1998 | Tanaka et al. |
| 5,790,403 A | 8/1998 | Nakayama |
| 5,906,645 A | 5/1999 | Kagawa et al. |
| 5,913,376 A | 6/1999 | Takei |
| 5,954,781 A | 9/1999 | Slepian et al. |
| 6,064,926 A | 5/2000 | Sarangapani et al. |
| 6,070,682 A | 6/2000 | Isogai et al. |
| 6,151,539 A | 11/2000 | Bergholz et al. |
| 6,195,610 B1 | 2/2001 | Kaneko |
| 6,226,570 B1 | 5/2001 | Hahn |
| 6,321,147 B1 | 11/2001 | Takeda et al. |
| 6,332,354 B1 | 12/2001 | Lalor |
| 6,343,247 B2 | 1/2002 | Jitsukata et al. |
| 6,385,539 B1 | 5/2002 | Wilson et al. |
| 6,438,472 B1 | 8/2002 | Tano et al. |
| 6,438,491 B1 | 8/2002 | Farmer |
| 6,470,874 B1 | 10/2002 | Mertes |
| 6,504,259 B1 | 1/2003 | Kuroda et al. |
| 6,516,262 B2 | 2/2003 | Takenaga et al. |
| 6,591,172 B2 | 7/2003 | Oda et al. |
| 6,643,576 B1 | 11/2003 | O Connor et al. |
| 6,832,156 B2 | 12/2004 | Farmer |
| 6,836,719 B2 | 12/2004 | Andersson et al. |
| 6,847,869 B2 | 1/2005 | Dewberry et al. |
| 6,862,524 B1 | 3/2005 | Nagda et al. |
| 6,876,908 B2 | 4/2005 | Cramer et al. |
| 6,934,613 B2 | 8/2005 | Yun |
| 7,011,186 B2 | 3/2006 | Frentz et al. |
| 7,031,829 B2 | 4/2006 | Nisiyama |
| 7,102,496 B1 | 9/2006 | Ernst, Jr. et al. |
| 7,177,760 B2 | 2/2007 | Kudo |
| 7,194,347 B2 | 3/2007 | Harumoto et al. |
| 7,207,304 B2 | 4/2007 | Iwatsuki et al. |
| 7,233,861 B2 | 6/2007 | Van Buer et al. |
| 7,327,242 B2 | 2/2008 | Holloway et al. |
| 7,346,439 B2 | 3/2008 | Bodin |
| 7,373,237 B2 | 5/2008 | Wagner et al. |
| 7,394,046 B2 | 7/2008 | Olsson et al. |
| 7,486,802 B2 | 2/2009 | Hougen |
| 7,499,774 B2 | 3/2009 | Barrett et al. |
| 7,499,776 B2 | 3/2009 | Allard et al. |
| 7,499,804 B2 | 3/2009 | Svendsen et al. |
| 7,515,101 B1 | 4/2009 | Bhogal et al. |
| 7,565,241 B2 | 7/2009 | Tauchi |
| 7,579,942 B2 | 8/2009 | Kalik |
| 7,656,280 B2 | 2/2010 | Hines et al. |
| 7,694,555 B2 | 4/2010 | Howell et al. |
| 7,778,759 B2 | 8/2010 | Tange et al. |
| 7,818,124 B2 | 10/2010 | Herbst et al. |
| 7,835,859 B2 | 11/2010 | Bill |
| 7,865,277 B1 | 1/2011 | Larson et al. |
| 7,894,951 B2 | 2/2011 | Norris et al. |
| 7,908,040 B2 | 3/2011 | Howard et al. |
| 7,956,730 B2 | 6/2011 | White et al. |
| 7,979,175 B2 | 7/2011 | Allard et al. |
| 8,024,102 B2 | 9/2011 | Swoboda et al. |
| 8,050,863 B2 | 11/2011 | Trepagnier et al. |
| 8,078,349 B1 | 12/2011 | Prada Gomez et al. |
| 8,095,313 B1 * | 1/2012 | Blackburn .................... 701/301 |
| 8,126,642 B2 | 2/2012 | Trepagnier et al. |
| 8,190,322 B2 | 5/2012 | Lin et al. |
| 8,195,341 B2 | 6/2012 | Huang et al. |
| 8,244,408 B2 | 8/2012 | Lee et al. |
| 8,244,458 B1 * | 8/2012 | Blackburn .................... 701/301 |
| 8,260,515 B2 | 9/2012 | Huang et al. |
| 8,280,601 B2 | 10/2012 | Huang et al. |
| 8,280,623 B2 | 10/2012 | Trepagnier et al. |
| 8,352,111 B2 | 1/2013 | Mudalige |
| 8,352,112 B2 | 1/2013 | Mudalige |
| 8,412,449 B2 | 4/2013 | Trepagnier et al. |
| 8,452,506 B2 | 5/2013 | Groult |
| 8,634,980 B1 | 1/2014 | Urmson et al. |
| 8,706,394 B2 | 4/2014 | Trepagnier et al. |
| 8,718,861 B1 | 5/2014 | Montemerlo et al. |
| 2001/0037927 A1 | 11/2001 | Nagler et al. |
| 2003/0016804 A1 | 1/2003 | Sheha et al. |
| 2003/0055554 A1 | 3/2003 | Shioda et al. |
| 2003/0093209 A1 | 5/2003 | Andersson et al. |
| 2004/0243292 A1 | 12/2004 | Roy |
| 2005/0012589 A1 | 1/2005 | Kokubu et al. |
| 2005/0125154 A1 | 6/2005 | Kawasaki |
| 2005/0149251 A1 | 7/2005 | Donath et al. |
| 2005/0273251 A1 | 12/2005 | Nix et al. |
| 2006/0037573 A1 | 2/2006 | Iwatsuki et al. |
| 2006/0082437 A1 | 4/2006 | Yuhara |
| 2006/0089764 A1 | 4/2006 | Filippov et al. |
| 2006/0089765 A1 | 4/2006 | Pack et al. |
| 2006/0089800 A1 | 4/2006 | Svendsen et al. |
| 2006/0173841 A1 | 8/2006 | Bill |
| 2006/0178240 A1 | 8/2006 | Hansel |
| 2006/0276942 A1 | 12/2006 | Anderson et al. |
| 2007/0010942 A1 | 1/2007 | Bill |
| 2007/0142992 A1 | 6/2007 | Gronau et al. |
| 2007/0165910 A1 | 7/2007 | Nagaoka et al. |
| 2007/0225909 A1 | 9/2007 | Sakano |
| 2007/0239331 A1 | 10/2007 | Kaplan |
| 2007/0247281 A1 | 10/2007 | Shimomura |
| 2008/0021628 A1 | 1/2008 | Tryon |
| 2008/0039991 A1 | 2/2008 | May et al. |
| 2008/0059015 A1 | 3/2008 | Whittaker et al. |
| 2008/0059048 A1 | 3/2008 | Kessler et al. |
| 2008/0084283 A1 | 4/2008 | Kalik |
| 2008/0120025 A1 | 5/2008 | Naitou et al. |
| 2008/0120171 A1 | 5/2008 | Ikeuchi et al. |
| 2008/0147253 A1 | 6/2008 | Breed |
| 2008/0161987 A1 | 7/2008 | Breed |
| 2008/0167771 A1 | 7/2008 | Whittaker et al. |
| 2008/0183512 A1 | 7/2008 | Benzinger et al. |
| 2008/0188246 A1 | 8/2008 | Sheha et al. |
| 2008/0195268 A1 | 8/2008 | Sapilewski et al. |
| 2008/0277183 A1 | 11/2008 | Huang et al. |
| 2008/0303696 A1 | 12/2008 | Aso et al. |
| 2008/0306969 A1 | 12/2008 | Mehta et al. |
| 2009/0005959 A1 | 1/2009 | Bargman et al. |
| 2009/0074249 A1 | 3/2009 | Moed et al. |
| 2009/0082879 A1 | 3/2009 | Dooley et al. |
| 2009/0115594 A1 | 5/2009 | Han |
| 2009/0164071 A1 | 6/2009 | Takeda |
| 2009/0198400 A1 | 8/2009 | Allard et al. |
| 2009/0248231 A1 | 10/2009 | Kamiya |
| 2009/0276154 A1 | 11/2009 | Subramanian et al. |
| 2009/0287367 A1 | 11/2009 | Salinger |
| 2009/0287368 A1 | 11/2009 | Bonne |
| 2009/0306834 A1 | 12/2009 | Hjelm et al. |
| 2009/0319096 A1 | 12/2009 | Offer et al. |
| 2009/0319112 A1 | 12/2009 | Fregene et al. |
| 2009/0326799 A1 | 12/2009 | Crook |
| 2010/0017056 A1 | 1/2010 | Asakura et al. |
| 2010/0052945 A1 | 3/2010 | Breed |
| 2010/0066587 A1 | 3/2010 | Yamauchi et al. |
| 2010/0076640 A1 | 3/2010 | Maekawa et al. |
| 2010/0079590 A1 | 4/2010 | Kuehnle et al. |
| 2010/0179715 A1 | 7/2010 | Puddy |
| 2010/0179720 A1 | 7/2010 | Lin et al. |
| 2010/0191433 A1 | 7/2010 | Groult |
| 2010/0205132 A1 | 8/2010 | Taguchi |
| 2010/0228419 A1 | 9/2010 | Lee et al. |
| 2010/0241297 A1 | 9/2010 | Aoki et al. |
| 2010/0253542 A1 | 10/2010 | Seder et al. |
| 2010/0256836 A1 | 10/2010 | Mudalige |
| 2011/0071718 A1 | 3/2011 | Norris et al. |
| 2011/0137520 A1 | 6/2011 | Rector et al. |
| 2011/0150348 A1 | 6/2011 | Anderson |
| 2011/0206273 A1 | 8/2011 | Plagemann et al. |
| 2011/0210866 A1 * | 9/2011 | David et al. .................... 340/903 |
| 2011/0213511 A1 | 9/2011 | Visconti et al. |
| 2011/0246156 A1 | 10/2011 | Zecha et al. |
| 2011/0254655 A1 | 10/2011 | Maalouf et al. |
| 2012/0053775 A1 | 3/2012 | Nettleton et al. |
| 2012/0114178 A1 | 5/2012 | Platonov et al. |
| 2012/0157052 A1 | 6/2012 | Quade |

(56) References Cited

U.S. PATENT DOCUMENTS

| | | |
|---|---|---|
| 2012/0277947 A1 | 11/2012 | Boehringer et al. |
| 2012/0283912 A1 | 11/2012 | Lee et al. |
| 2013/0054049 A1 | 2/2013 | Uno |
| 2013/0054106 A1 | 2/2013 | Schmudderich et al. |
| 2013/0144520 A1* | 6/2013 | Ricci .............................. 701/301 |
| 2013/0179382 A1 | 7/2013 | Fritsch et al. |
| 2013/0282277 A1* | 10/2013 | Rubin et al. .................. 701/517 |
| 2014/0088855 A1 | 3/2014 | Ferguson |
| 2014/0156164 A1* | 6/2014 | Schuberth et al. .............. 701/96 |

FOREIGN PATENT DOCUMENTS

| | | |
|---|---|---|
| CN | 101522493 A | 9/2009 |
| DE | 102009010006 A1 | 10/2009 |
| EP | 0884666 A1 | 12/1998 |
| EP | 2216225 A1 | 8/2010 |
| JP | 09-160643 A | 6/1997 |
| JP | 11282530 A | 10/1999 |
| JP | 2000149188 A | 5/2000 |
| JP | 2000305625 A | 11/2000 |
| JP | 2000338008 A | 12/2000 |
| JP | 2001-101599 A | 4/2001 |
| JP | 2002236993 A | 8/2002 |
| JP | 2002251690 A | 9/2002 |
| JP | 2003081039 A | 3/2003 |
| JP | 2003162799 A | 6/2003 |
| JP | 2005067483 A | 3/2005 |
| JP | 2005071114 A | 3/2005 |
| JP | 2005339181 A | 12/2005 |
| JP | 2006322752 A | 11/2006 |
| JP | 2007001475 A | 1/2007 |
| JP | 2008117082 A | 5/2008 |
| JP | 2008152655 A | 7/2008 |
| JP | 2008170404 A | 7/2008 |
| JP | 2008290680 A | 12/2008 |
| JP | 2009053925 A | 3/2009 |
| WO | 0070941 A1 | 11/2000 |
| WO | 0188827 A1 | 11/2001 |
| WO | 2009028558 A1 | 3/2009 |
| WO | 2009155228 A1 | 12/2009 |
| WO | 2011021046 A1 | 2/2011 |

OTHER PUBLICATIONS

"Fact Sheet: Beyond Traffic Signals: A Paradigm Shift Intersection Control for Autonomous Vehicles", [online]. [Retrieved Apr. 27, 2011]. Retrieved from the internet: <http://www.fhwa.dot.gov/advancedresearch/pubs/10023/index.cfm>, 3 pages.

"Google Cars Drive Themselves, in Traffic" [online]. [Retrieved Aug. 19, 2011] Retrieved from the internet: <http://www.nytimes.com/2010/10/10/science/10google.html>, 4 pages.

Carl Crane, David Armstrong, Antonio Arroyo, Antoin Baker, Doug Dankel, Greg Garcia, Nicholas Johnson, Jaesang Lee, Shannon Ridgeway, Eric Schwartz, Eric Thorn, Steve Velat, and Ji Hyun Yoon, Team Gator Nation's Autonomous Vehicle Development for the 2007 DARPA Urban Challenge, Dec. 2007, 27 pages.

Eric Guizzo, How's Google's Self-Driving Car Works, IEEE. Org, IEEE, Oct. 18, 2011, pp. 1/31/-31/31.

International Search Report and the Written Opinion for Application No. PCT/US 2011/054154, Apr. 24, 2012.

International Search Report and the Written Opinion for Application No. PCT/US 2011/054896, Apr. 25, 2012.

International Search Report and Written Opinion for Application No. PCT/US2013/061604 dated Jul. 3, 2014.

International Search Report and Written Opinion for Application No. PCT/US2011/054899 dated May 4, 2012.

Martin Schonhof, Martin Treiber, Arne Kesting, and Dirk Helbing, Autonomous Detection and Anticipation of Jam Fronts From Messages Propagated by Intervehicle Communication, 2007, pp. 3-12.

Matthew McNaughton, Motion Planning for Autonomous Driving with a Conformal Spatiotempral Lattice, Internation Conference on Robotics and Automation, May 9-13, pp. 4889-4895.

Vincenzo DiLecce and Marco Calabrese, Experimental System to Support Real-Time Driving Pattern Recognition, 2008, pp. 1192-1199.

Jaffe, "The First Look at How Google's Self-Driving Car Handles City Streets", The Atlantic City Lab, Apr. 28, 2014.

* cited by examiner

PREDICTING TRAJECTORIES OF OBJECTS BASED ON CONTEXTUAL INFORMATION

BACKGROUND

Autonomous vehicles, such as vehicles which do not require a human driver, may be used to aid in the transport of passengers or items from one location to another. An important component of an autonomous vehicle is the perception system, which allows the vehicle to perceive and interpret its surroundings using cameras, radar, sensors, and other similar devices. The perception system executes numerous decisions while the autonomous vehicle is in motion, such as speeding up, slowing down, stopping, turning, etc. Autonomous vehicles may also use the cameras, sensors, and global positioning devices to gather and interpret images and sensor data about its surrounding environment, e.g., pedestrians, bicyclists, other vehicles, parked cars, trees, buildings, etc.

Information from the perception system may be combined with highly detailed map information in order to allow a vehicle's computer to safely maneuver the vehicle in various environments. This highly detailed map information may describe expected conditions of the vehicle's environment such as the shape and location of roads, parking spots, dead zones, traffic signals, and other objects. In this regard, the information from the perception system and detailed map information may be used to assist a vehicle's computer in making driving decisions involving intersections and traffic signals.

BRIEF SUMMARY

One aspect of the disclosure provides a computer-implemented method. The method includes identifying, by one or more computing devices, an object in a vehicle's environment. The object may be associated with a heading and a location. The method further includes generating, by the one or more computing devices, a set of possible actions for the object. The set of possible actions may be generated using the heading and location of the object and map information that describes the vehicle's environment. The method may then generate a set of possible future trajectories of the object based on the set of possible actions. The method includes receiving contextual information and determining a likelihood value of each trajectory in the set of possible future trajectories based on the contextual information. According to some examples, the contextual information may include a status of the detected object. The method includes determining, by the one or more computing devices, a final future trajectory based on the determined likelihood value for each trajectory of the set of possible future trajectories and maneuvering the vehicle in order to avoid the final future trajectory and the object.

In some examples, determining the final future trajectory may include comparing the likelihood value for each trajectory to a threshold value and discarding trajectories when the likelihood value of that trajectory does not meet the threshold value. Accordingly, the likelihood value of the discarded trajectory may not be used to determine the final future trajectory. When none of the trajectories meet the threshold value, the method may include identifying a plurality of waypoints for each trajectory in the set of trajectories. A waypoint may include at least one of a position, a velocity, and a timestamp. The method may include determining a trajectory of the vehicle that includes a plurality of waypoints. The method may then compare each of the waypoints to a waypoint associated with a trajectory of the vehicle at a same timestamp in order to determine the final future trajectory.

According to other examples, determining the final future trajectory may include identifying a situational relationship between the object and the vehicle. The method may then compare the likelihood value of the trajectories remaining in the set to a second threshold different from the first threshold value and discard a second trajectory from the set of trajectories when the likelihood value of that second trajectory does not meet the second threshold value. Accordingly, the likelihood value of the discarded second trajectory may not be used to determine the final future trajectory. After discarding the second trajectory, the remaining trajectories may be identified as final future trajectories. In this regard, the method includes maneuvering the vehicle to avoid each of the remaining trajectories.

In some examples, the method may include determining the final future trajectory by selecting a trajectory with the highest likelihood value as the final future trajectory. Additionally, the method may include discarding an action from the set of possible actions for failing to comply with a model of possible actions for the object. The method may also include generating the set of possible actions based on a past trajectory of the object. According to other examples, the contextual information may describe a status of a second object in the vehicle's environment.

Another aspect of the disclosure provides a system comprising one or more computing devices. The one or more computing devices are configured to identify an object in a vehicle's environment, the object having a heading and location and generate a set of possible actions for the object using the heading and location of the object and map information. The one or more computing devices are configured to generate a set of possible future trajectories of the object based on the set of possible actions. The one or more computing devices may receive contextual information to determine a likelihood value of each trajectory. In some examples the likelihood value includes a status of the detected object. The one or more computing devices are also configured to determine a final future trajectory based on the likelihood value for each trajectory and maneuver the vehicle in order to avoid the final future trajectory and the object.

In one example, the one or more computing devices may determine the final future trajectory by comparing the likelihood value for each trajectory to a threshold value and discarding trajectories when the likelihood value does not meet the threshold value. The likelihood value of the discarded trajectory may not be used to determine the final future trajectory. The one or more computing devices may also be configured to identify a plurality of waypoints for each trajectory when none of the trajectories meet the threshold value. The waypoint may include a position, a velocity, or a timestamp of the detected object. The one or more computing devices may be configured to determine a trajectory of the vehicle that includes a plurality of waypoints and comparing each of the trajectory waypoints to a waypoint of the trajectory of the vehicle at the same time to determine the final future trajectory. The one or more computing devices may be configured to determine the final future trajectory by identifying a situational relationship between the object and the vehicle and comparing the likelihood value of the remaining trajectories to a second threshold different from the first threshold value. The one or more computing devices may subsequently discard a second trajectory when the likelihood value of that second trajectory does not meet the second threshold value. Accordingly, the likelihood value of the discarded second trajectory may not be used to determine the final future trajectory. After discarding the second trajectory (trajectories), the one or more computing devices are configured to identify the remaining trajectories and maneuver the vehicle to avoid each of the remaining trajectories. In some examples, the one or more computing devices are configured to determine the final future trajectory by selecting a trajectory with the highest likelihood value. In other examples, the one or more computing devices are configured to determine the final future trajectory by discarding an action for failing to comply with a model of possible actions for the object. Additionally, the one or more computing devices may be configured to generate the set of possible actions based on a past trajectory of the object. According to some examples, the vehicle is an autonomous vehicle.

A further aspect of the disclosure provides a non-transitory computer-readable medium on which instructions are stored. The instructions, when executed by one or more processors cause the one or more processors to perform a method. The method includes identifying, by one or more computing devices, an object in a vehicle's environment. The object may be associated with a heading and a location. The method further includes generating, by the one or more computing devices, a set of possible actions for the object. The set of possible actions may be generated using the heading and location of the object and map information that describes the vehicle's environment. The method may then generate a set of possible future trajectories of the object based on the set of possible actions. The method includes receiving contextual information and determining a likelihood value of each trajectory of the set of possible future trajectories based on the contextual information. According to some examples, the contextual information may include a status of the detected object. The method includes determining, by the one or more computing devices, a final future trajectory based on the determined likelihood value for each trajectory of the set of possible future trajectories. Finally, the method includes maneuvering the vehicle in order to avoid the final future trajectory and the object.

DETAILED DESCRIPTION

Overview

Figure 1:
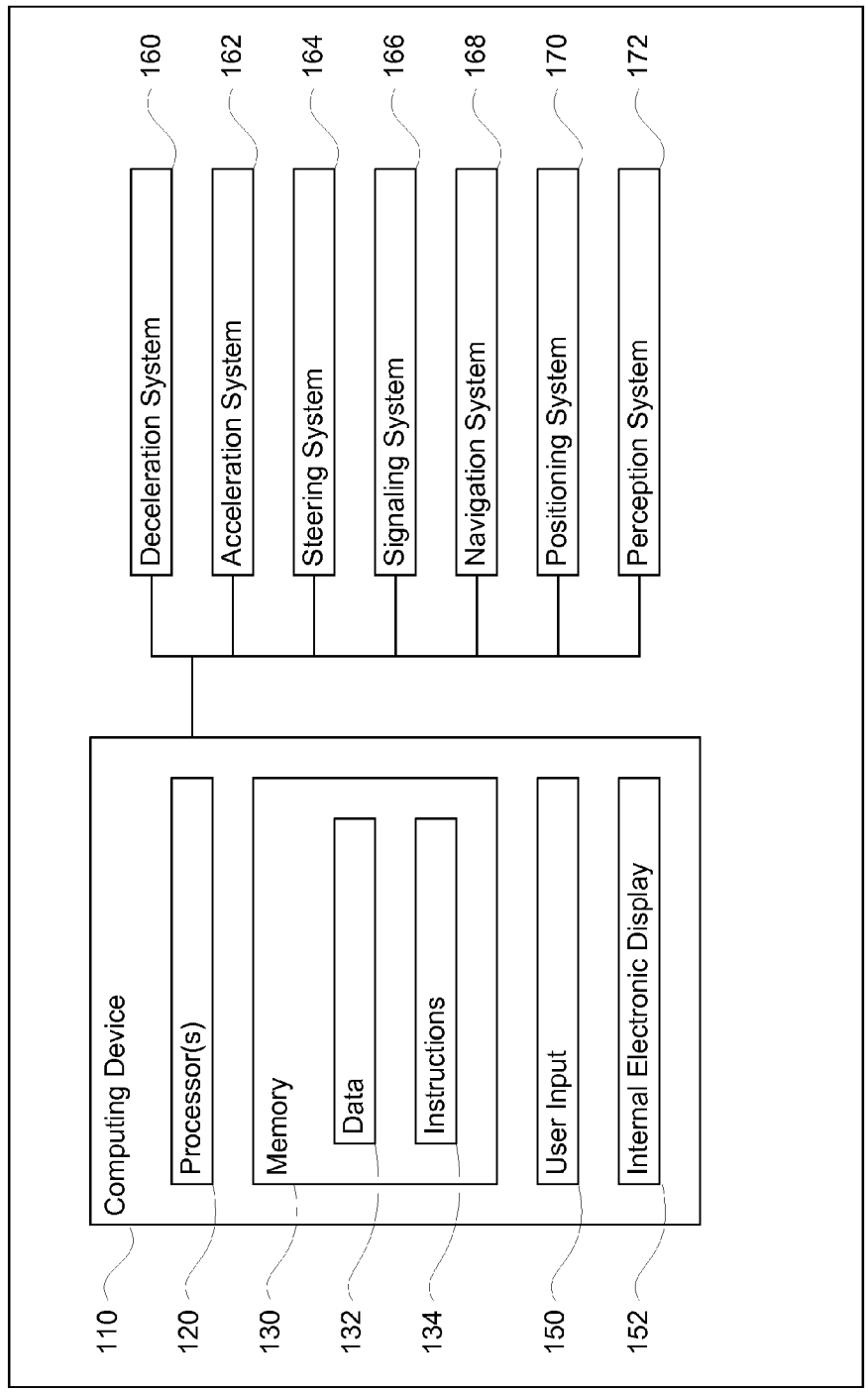
FIG. 1 is a functional diagram of a system in accordance with aspects of the disclosure.

The present disclosure relates to predicting the trajectory of objects and using the predicted trajectories to modify vehicle behavior. For example, a vehicle navigating a roadway may need to keep track of and predict what other objects in the vehicle's environment, such as other vehicles, bikes, pedestrians, animals, etc., are going to do. The failure to do so may result in collisions, reckless and erratic driving, or other hazardous situations. Accordingly, safer driving conditions may be achieved by accurately predicting the trajectory of other objects based on combining detailed map information and contextual information of other objects.

In order to predict the trajectory of other objects, the vehicle's computer may access the detailed map information and contextual information of the detected objects. The map information may include detailed information about intersections, lanes (e.g. turn-only lanes), exit only lanes, lane locations, parking spots, stop signs, traffic lights, clear zones (explicit or implicit, such as a railroad crossing or an intersection), driveways, parking lot entrances/exits, etc. Additionally, the map information may also include information about speed limits for each lane. The detailed map information may be updated to include changes to road conditions, such as temporary road closures, detours, etc.

The vehicle may detect objects in the vehicle's environment using sensors mounted on the vehicle. For example, the vehicle may have several devices mounted thereon to detect the presence of objects around the vehicle, such as cameras, radar devices, sonar devices, LIDAR devices, etc. These devices may be used to detect objects around the vehicle, including pedestrians, other vehicles, bicycles, traffic signs (e.g., stop signs or yield signs), traffic lights, etc.

After the objects around the vehicle have been detected, a heading, estimated speed, location, size and/or shape for each of the objects may be determined. In some examples, acceleration, curvature, etc. may also be detected for each of the objects detected. The heading of a detected object may include the object's direction of movement. Location for each the objects may include the position of the detected object in relation to the vehicle.

Additionally, location for each of the objects may also include geographic position (e.g., latitude, longitude). The location information may be used to identify information about the object's location relative to the detailed map information. For example, the detailed map information in conjunction with location information for an object may be used to determine that the object, such as a vehicle, is in a specific lane, such as a turn only-lane or the middle lane of a highway. In another example, the detailed map information in conjunction with location information for an object may be used to determine that the object, such as a bicyclist, is in a bike lane or the right most lane of traffic.

A set of possible actions for each detected objects may be generated, using the vehicle's computer, based on the detailed map information and the heading, location, size, and shape for that detected object. In this regard, limiting the set of possible actions for each detected object may be accomplished through kinematic or dynamic models of feasible behavior for the detected object. A potential trajectory for each action of the possible set of actions may be generated using the vehicle's computer. Potential trajectories may be generated using the detailed map information and contextual information, such as information about other objects (e.g. vehicles, pedestrians, cyclists, etc.). A potential trajectory may include predicted headings and locations of the detected object for some period of time into the future. In alternative examples, the potential trajectory may also include a predicted speed of the detected object.

The contextual information may also be generated using the vehicle's computer. In this regard, contextual information may include information about the detected object, such as a status of a turn signal or a brake light, as well as objects other than the detected object. For example, contextual information may include a type of the detected object (e.g. bike, pedestrian, etc.), the size and/or shape of the detected object, lighted signals from the detected objects, etc.

Additionally, the contextual information may include information about other objects. Again, the contextual information may identify a type of the other objects (e.g. bike, pedestrian, other vehicles, etc.), the heading and location of the other objects, the speed of the other objects, the size and/or shape of the other objects. Additionally, the contextual information may include environmental information, such as lighted signals from other objects, states of traffic signals, weather conditions (e.g. rain), traffic signs, etc.

Based on each potential trajectory and the contextual information, the vehicle's computer may determine a likelihood value for each trajectory for the detected object. For example, the likelihood value may indicate a likelihood of a given potential trajectory actually occurring. Thus, the likelihood value may be determined based on details of a single potential trajectory (e.g., possible future locations and headings) as well as the contextual information.

The vehicle's computer may use the potential trajectories to identify a final future trajectory. The trajectory with the highest likelihood value may be identified as the final future trajectory. In other examples a second threshold may be used to identify a subset of the trajectories based on a relationship between the vehicle and other objects. The vehicle's computer may react to all the trajectories in the subset of trajectories in planning a route for the vehicle. In still other examples, where there are no trajectories with likelihood values above the predetermined threshold, all of the potential trajectories may be further analyzed. This analysis may include taking a number of points along each of the trajectories. If points from different trajectories are within a predetermined distance from each other at a predetermined time, the likelihood values of those trajectories may be added up and compared to the threshold value. If the sum of the likelihood values meets the threshold value, then all of the trajectories that had their likelihood values summed together may be considered a final future trajectory. The final future trajectory may be used by the vehicle's computer to plan a route for the vehicle that, for example, avoids the vehicle coming too close to the object.

The aspects described herein may allow a vehicle's computer to make predictions of the trajectories of objects around a vehicle. Such predictions may help the vehicle's computer to navigate, provide notifications to drivers to keep them alert to their surroundings, improve safety, and reduce traffic accidents.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys. The vehicle may have one or more computing devices, such as computing device 110 containing one or more processors 120, memory 130 and other components typically present in general purpose computing devices.

The memory 130 stores information accessible by the one or more processors 120, including data 132 and instructions 134 that may be executed or otherwise used by the processor(s) 120. The memory 130 may be of any type capable of storing information accessible by the processor(s), including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 132 may be retrieved, stored or modified by processor(s) 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The one or more processors 120 may be any conventional processors, such as commercially available CPUs. Alternatively, the one or more processors may be a dedicated device such as an application specific integrated circuit (ASIC) or other hardware-based processor, such as a field programmable gate array (FPGA). Although FIG. 1 functionally illustrates the processor(s), memory, and other elements of computing device 110 as being within the same block, it will be understood by those of ordinary skill in the art that the processor, computing device, or memory may actually include multiple processors, computing devices, or memories that may or may not be stored within the same physical housing. For example, memory 130 may be a hard drive or other storage media located in a housing different from that of computing device 110. Accordingly, references to a processor or computing device will be understood to include references to a collection of processors or computing devices or memories that may or may not operate in parallel.

Computing device 110 may have all of the components normally used in connection with a computing device such as the processor and memory described above, as well as a user input 150 (e.g., a mouse, keyboard, touch screen and/or microphone) and various electronic displays (e.g., a monitor having a screen, a small LCD touch-screen or any other electrical device that is operable to display information). In this example, the vehicle includes an internal electronic display 152. In this regard, internal electronic display 152 may be located within a cabin of vehicle 100 and may be used by computing device 110 to provide information to passengers within the vehicle 100.

In one example, computing device 110 may be an autonomous driving computing system incorporated into vehicle 100. The autonomous driving computing system may be capable of communicating with various components of the vehicle as needed in order to control the vehicle in a fully autonomous driving mode (without input from a driver), as well as semiautonomous (some input from a driver) driving mode.

Figure 2:
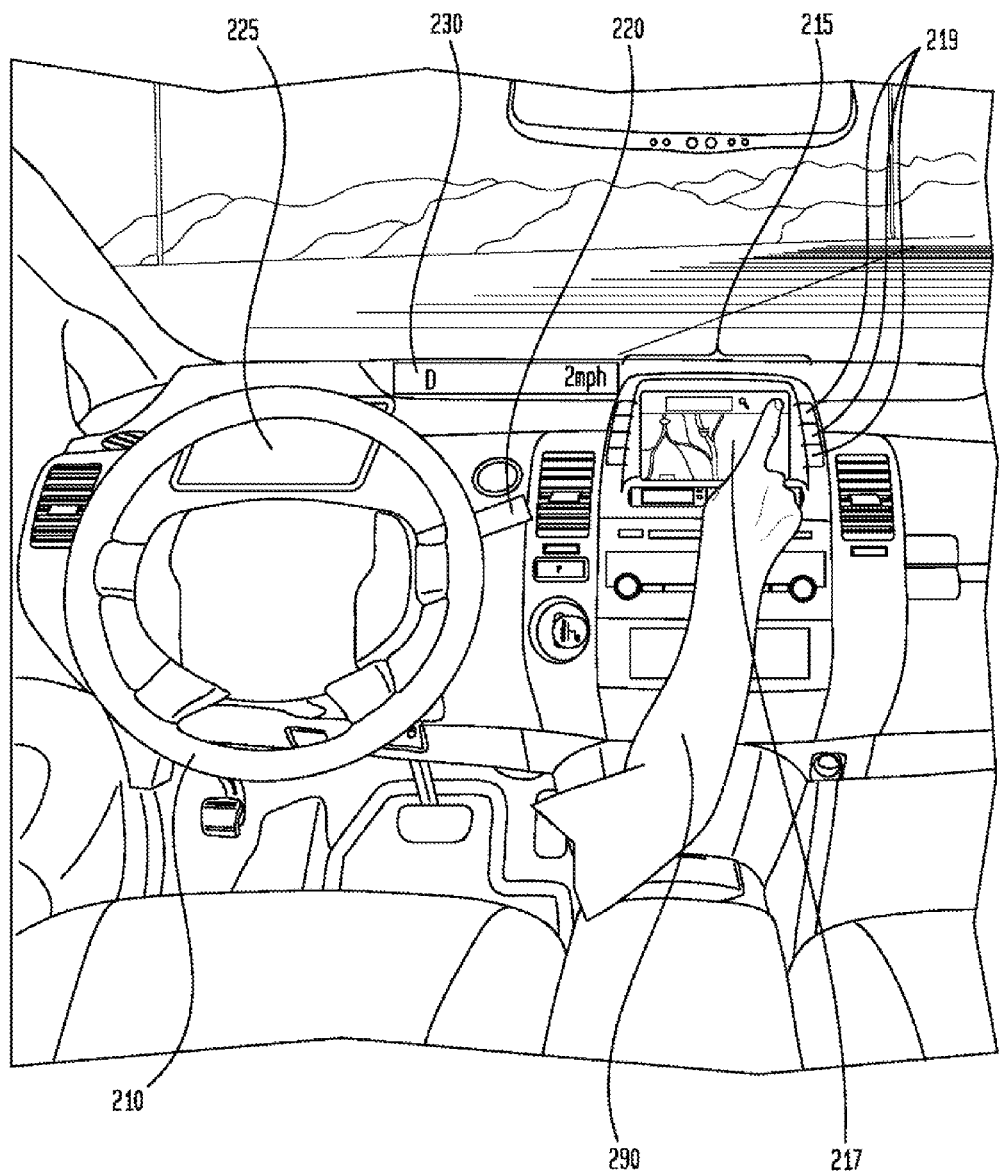
FIG. 2 is an interior of an autonomous vehicle in accordance with aspects of the disclosure.

As an example, FIG. 2 depicts an interior design of a vehicle having autonomous, semiautonomous, and manual (continuous input from a driver) driving modes. In this regard, the autonomous vehicle may include all of the features of a non-autonomous vehicle, for example: a steering apparatus, such as steering wheel 210; a navigation display apparatus, such as navigation display 215 (which may be a part of electronic display 152); and a gear selector apparatus, such as gear shifter 220. The vehicle may also have various user input devices 140 in addition to the foregoing, such as touch screen 217 (again, which may be a part of electronic display 152), or button inputs 219, for activating or deactivating one or more autonomous driving modes and for enabling a driver or passenger 290 to provide information, such as a navigation destination, to the computing device 110.

Returning to FIG. 1, when engaged, computer 110 may control some or all of these functions of vehicle 100 and thus be fully or partially autonomous. It will be understood that although various systems and computing device 110 are shown within vehicle 100, these elements may be external to vehicle 100 or physically separated by large distances.

In this regard, computing device 110 may be in communication with various systems of vehicle 100, such as deceleration system 160, acceleration system 162, steering system 164, signaling system 166, navigation system 168, positioning system 170, perception system 172, such that one or more systems working together may control the movement, speed, direction, etc. of vehicle 100 in accordance with the instructions 134 stored in memory 130. Although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 is configured for use on a road, such as a car or truck, the steering system may include components to control the angle of the wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 132 may store map information, e.g., highly detailed maps identifying the shape and elevation of roadways, lane lines, intersections, crosswalks, speed limits, traffic signals, buildings, signs, real time traffic information, vegetation, bike lanes, or other such objects and information. Additionally, the map information may be updated to include temporary information, such as temporarily blocked lanes due to construction, accident information, etc.

Figure 3:
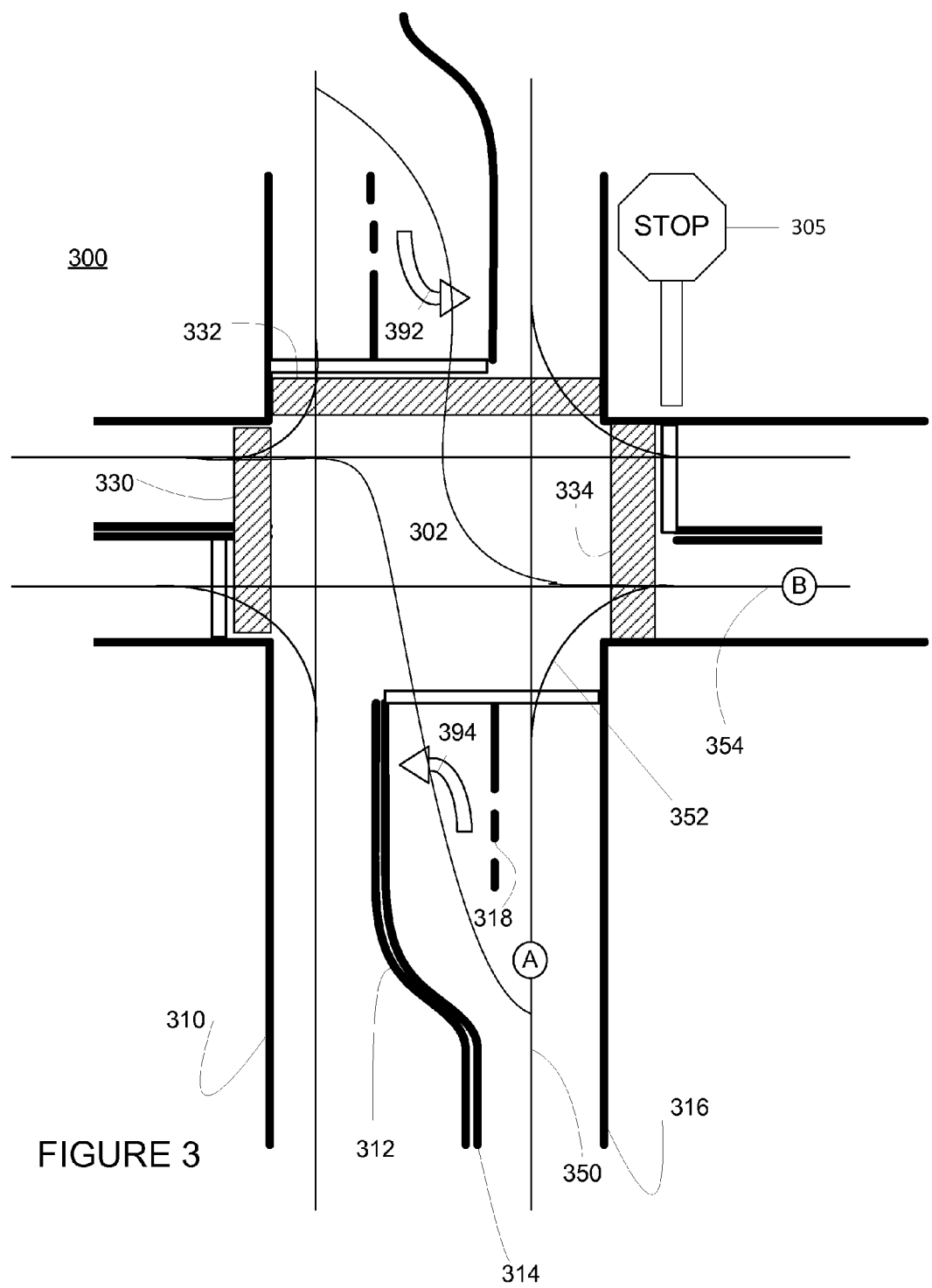
FIG. 3 is an example of detailed map information in accordance with aspects of the disclosure.

FIG. 3 is an example of detailed map information 300 for a section of roadway including an intersection 302. In this example, the detailed map information 300 includes information identifying the shape, location, and other characteristics of stop sign 305; lane lines 310, 312, 314, and 316; traffic signals 320, 322, 324, and 326; crosswalks 330, 332, and 334; and turn only lanes 392 and 394.

In addition, the detailed map information includes a network of rails 350, 352, and 354, which provide the vehicle's computer with guidelines for maneuvering the vehicle so that the vehicle follows the rails and obeys traffic laws. As an example, a vehicle's computer may maneuver the vehicle from point A to point B (two fictitious locations not actually part of the detailed map information) by following rail 350, transitioning to rail 352, and subsequently transitioning to rail 354 in order to make a right turn at intersection 302.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around the vehicle which can often be determined with less noise than absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 also includes one or more components for detecting and performing analysis on objects external to the vehicle, such as other vehicles, obstacles in the roadway, pedestrians, bicyclists, traffic signals, signs, trees, etc. For example, the perception system 172 may include lasers, sonar, radar, one or more cameras, or any other detection devices which record and process data that may be further processed by computing device 110. In the case where the vehicle is a small passenger vehicle, such as a car, the car may include a laser mounted on the roof or other convenient location, as well as other sensors, such as cameras, radars, sonars, and additional lasers.

Accordingly, the one or more computing devices 110 may control the direction and speed of the vehicle based information provided by the vehicle's various systems described above. By way of example, if the vehicle is operating completely autonomously, computing device 110 may navigate the vehicle to a location using data from the detailed map information and navigation system 168. Computing device 110 may use the positioning system 170 to determine the vehicle's location. Information from the perception system 172 may be used to detect and respond to objects when needed to reach a location safely. In order to do so, computing device 110 may cause the vehicle to accelerate (e.g., by increasing fuel or other energy provided to the engine by acceleration system 162), decelerate (e.g., by decreasing the fuel supplied to the engine or by applying brakes by deceleration system 160), change direction (e.g., by turning the front or rear wheels of vehicle 100 by steering system 164), and signal such changes (e.g. by lighting turn signals of signaling system 166).

Figure 4:
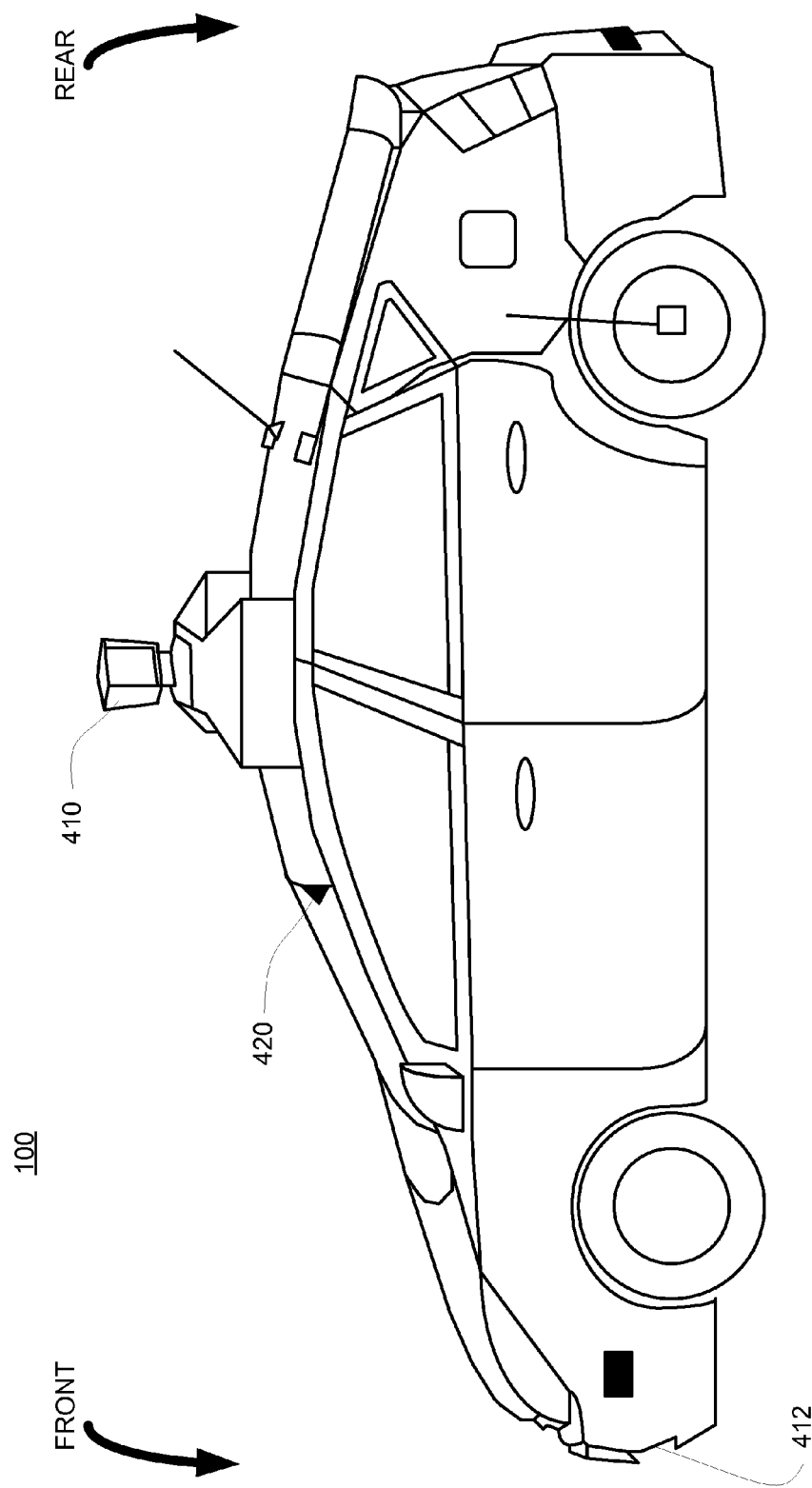
FIG. 4 is an exterior of an autonomous vehicle in accordance with aspects of the disclosure.

FIG. 4 is an example external view of vehicle 100 described above. As shown, various components of the perception system 172 may be positioned on or in the vehicle 100 in order to better detect external objects while the vehicle is being driven. In this regard, one or more sensors, such as laser range finders 410 and 412 may be positioned or mounted on the vehicle. As an example, the one or more computing devices 110 (not shown) may control laser range finder 410, e.g., by rotating the laser range finder 410 180 degrees. In addition, the perception system may include one or more cameras 420 mounted internally on the windshield of vehicle 100 to receive and analyze various images about the environment. In addition to the laser range finder 410 is positioned on top of perception system 172 in FIG. 4, and the one or more cameras 420 mounted internally on the windshield, other detection devices, such as sonar, radar, GPS, etc., may also be positioned in a similar manner.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 5A:
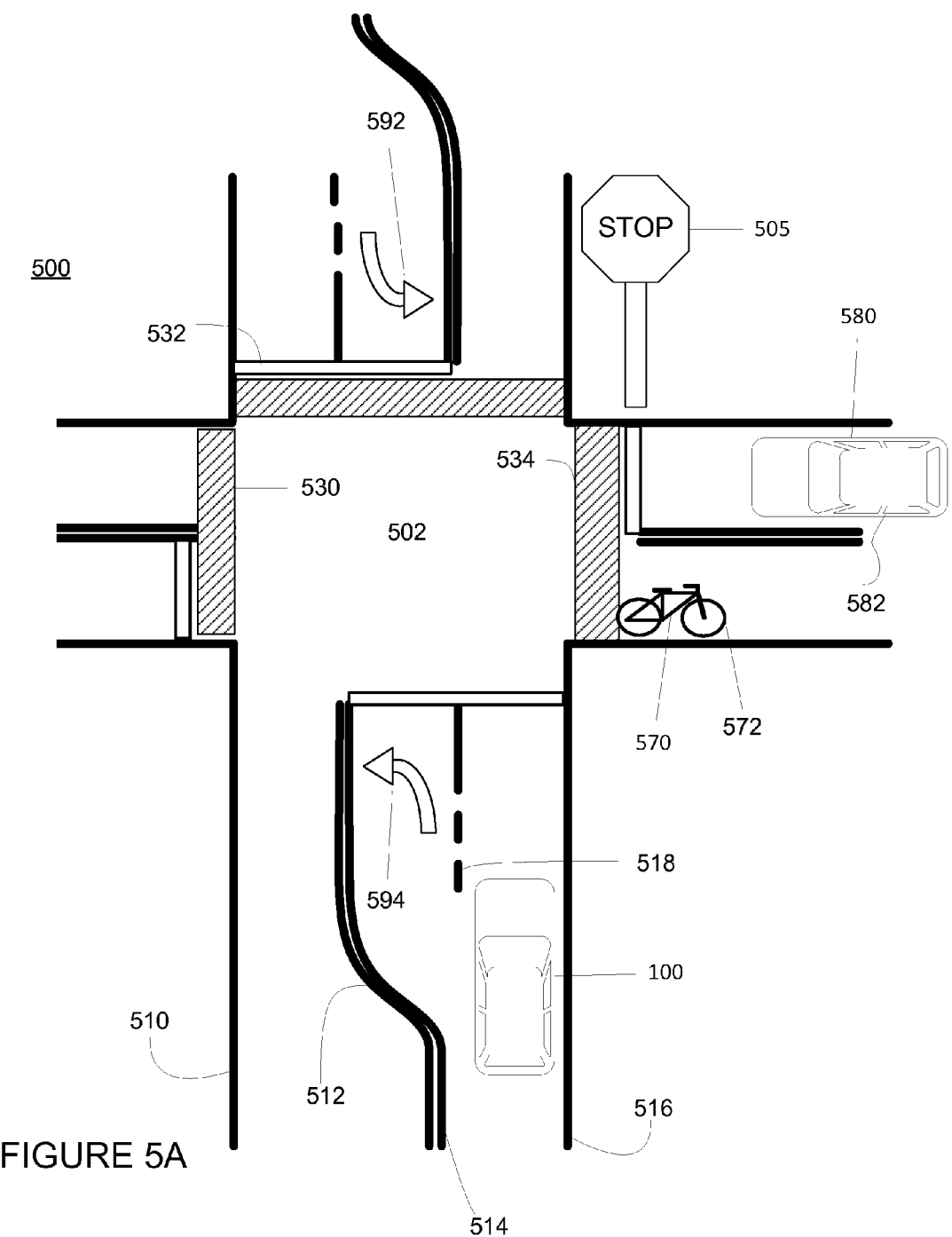
FIGS. 5A and 5B are an example of objects identified by a perception system in accordance with aspects of the disclosure.

As noted above, a vehicle's one or more computing devices may maneuver the vehicle using the various systems described above. In the example of FIG. 5A, vehicle 100 is depicted on a section of roadway 500 approaching an intersection 502. In this example, intersection 502 corresponds to the intersection 302 of the detailed map information 300. In this regard, lane lines 510, 512, 514, and 516 correspond to the shape, location, and other characteristics of lane lines 310, 312, 314, and 316, respectively. Similarly crosswalks 530, 532, and 534 correspond to the shape, location, and other characteristics of crosswalks 330, 332, and 334, respectively. Additionally, turn-only lanes 592 and 594 correspond to the turn-only lanes 392 and 394, respectively. Further, stop sign 505 corresponds to the stop sign 305.

As the vehicle is being maneuvered, the perception system 172 may detect and identify various objects in the vehicle's environment. In the example of FIG. 5, the perception system 172 may detect the lane lines 510, 512, 514, and 516; the crosswalks 530, 532, and 534; the turn only lanes 592 and 594; and the stop sign 505. In addition, the perception system may also detect the location of vehicle 580 and a bicyclist 570.

As noted above, the perception system 172 may determine various characteristics of these objects such as the type of each object. As an example, the detected objects may be compared to the detailed map information in order to determine whether the objects have a corresponding feature in the detailed map information. For objects such as the lane lines and crosswalks, this may be used to identify the types of these objects by comparison to the corresponding lane lines and crosswalks of the detailed map information.

Figure 5B:
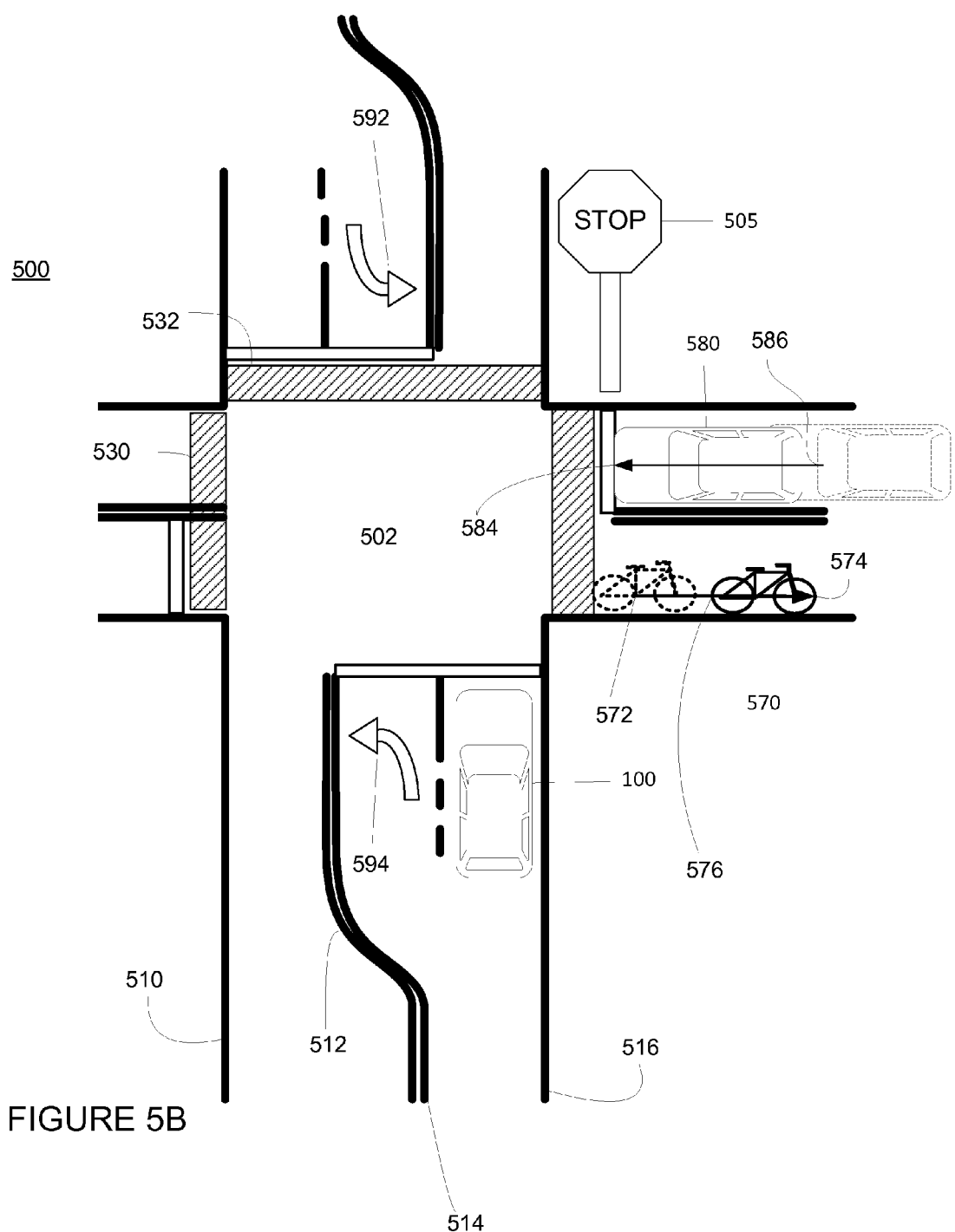

By tracking the location of objects over a brief period of time, the perception system may also determine a heading and speed for each of the objects. This brief period of time may be a fraction of a second or more or less. In addition, this information may be plotted in order to determine a past trajectory of the object. This information may be used to determine a heading, a speed, a location, whether there is a change in speed (such as acceleration or deceleration) or heading, for the object. As shown in the example of FIG. 5B, the perception system may track the location of vehicle 580 from location 582 (shown in FIG. 5B in dashed line) to location 584. Accordingly the perception system may plot the path of the vehicle 580 between the points of location 582 and location 584 to determine a past trajectory 586 for vehicle 580. The direction of trajectory 586 or heading of vehicle 580 is indicated by the arrow of trajectory 586. The speed of vehicle 580 may be determined by taking the change in location over the brief period of time.

Likewise, the perception system may also track the location of the bicyclist 570 from the location 572 (shown in FIG. 5B in dashed line) to location 574. The perception system may plot the path of the bicyclist 570 between the points of location 572 and location 574 to determine a past trajectory 576 for the bicyclist 570. The direction of trajectory 576 or heading of the bicyclist 570 may be indicated by the arrow of trajectory 576. Further, the speed of the bicyclist 570 may be determined by determining the change in distance over the change in time.

In addition to moving objects, the perception system 172 may also track stationary objects over time to determine that such objects are in fact stationary. In this regard, some objects, such as the lane lines 510, 512, 514, and 516, the crosswalks 530, 532, and 534, and the turn only lanes 552 and 554, which will not have moved in the brief period of time may be identified as stationary.

The perception system may also identify contextual information. As an example, the perception system may detect a turn signal or a deceleration of the vehicle 580 for example by identifying the status of a turn signal or brake lights from an image captured by a camera of the vehicle using any known image processing technique. In examples where a turn signal of vehicle 580 is within a line of site of the sensors of the perception system, the perception system may detect brake lights. Alternatively, the perception system may detect a change in speed using the past trajectory described above.

The perception system may also identify contextual information about humans. For example, the perception system may detect a direction that a pedestrian is facing or gestures, such as hand signals or nodding. Similarly, the perception system may detect the direction, heading, location and speed of a cyclist. Additionally, the perception system may also determine hand signals and other gestures performed by a cyclist.

Other examples of contextual information may include information about other objects in the vehicle 100's environment. Additionally, the contextual information may include detecting the color or shape of a traffic sign, the color of a traffic light, or a flashing signal, for example, from an image captured by a camera of the vehicle using any known image processing technique.

Figure 6:
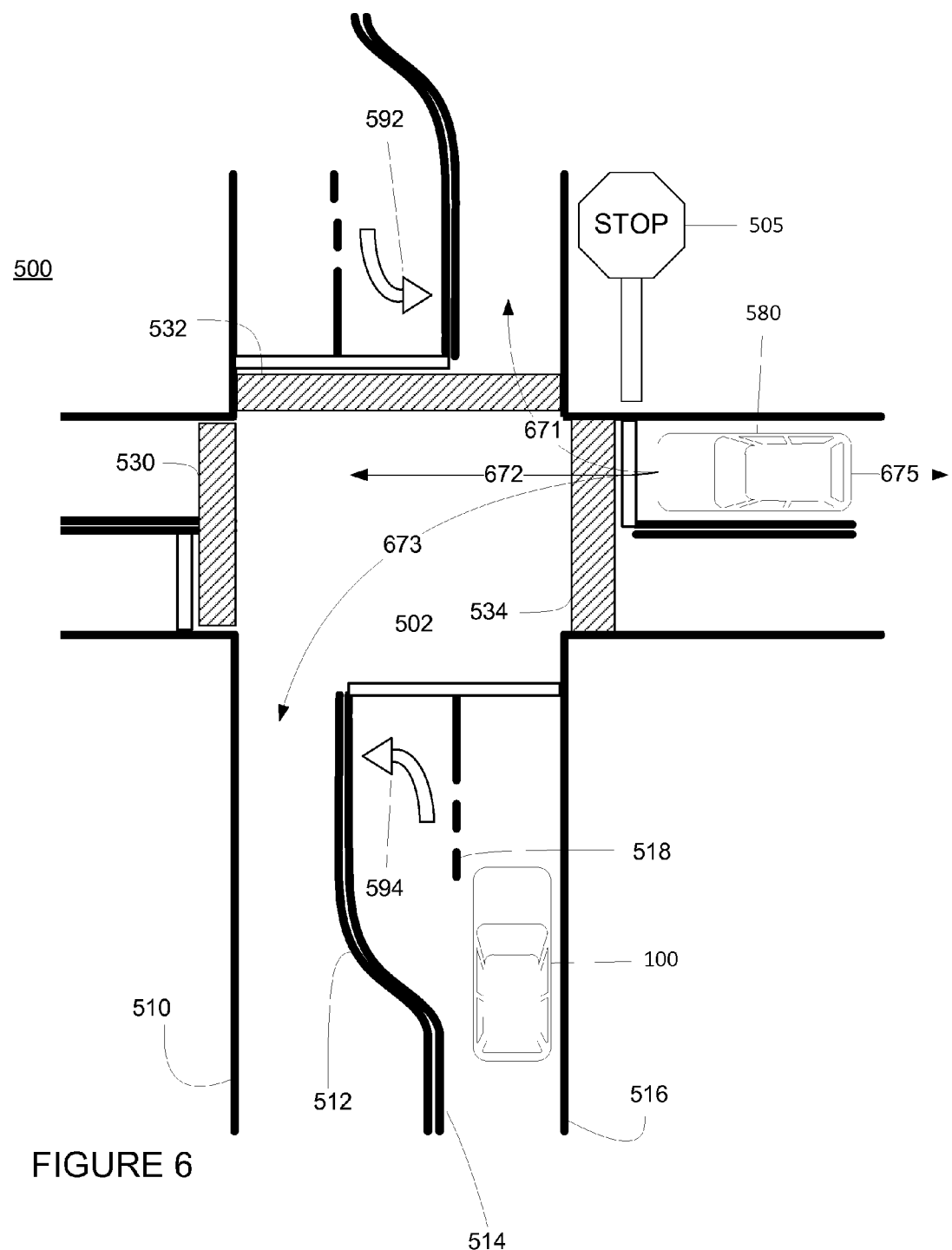
FIG. 6 is an example of generating a set of possible actions for a detected object in accordance with aspects of the disclosure.

Using the past trajectories and speeds, the vehicle's one or more computing devices may determine a set of possible actions for each non-stationary object. FIG. 6 shows an example of generating a set of possible actions based on the information obtained from the perception system. As shown in FIG. 6, the set of possible actions for vehicle 580 as the vehicle 580 approaches intersection 502 may include right turn 671, continuing straight 672, left turn 673, and reverse 675. For clarity, the trajectory 586 is not shown in FIG. 6. Although the set of possible actions is only shown for vehicle 580 in FIG. 6, a set of possible actions may be generated for each of the detected objects which are not identified as stationary based on the past trajectory and speeds for each object.

In addition, the detailed map information may also be used to limit the set of possible actions. For example, the one or more computing devices may detect the speed of a given vehicle, for example, to be 25 MPH. If the given vehicle begins to accelerate, for example at a rate of 2 m/s², the one or more computing devices may determine that the set of possible actions include the vehicle continuing to accelerate at the same rate for a given period of time, after a short period reducing the rate of acceleration, after a short period increasing the rate of acceleration, continuing to accelerate until a specific speed is reached, etc. However, combining the location information with the speed limits of the detailed map information, the one or more computing devices may determine that the given vehicle is traveling in a 35 MPH zone. Given this information, the one or more computing devices may eliminate possible actions where the vehicle continues to accelerate after a speed of 45 MPH is reached. Thus, any action where the given vehicle would keep accelerating at 2 m/s² for the next 10 seconds to reach approximately 65 MPH may be eliminated from the set of possible actions.

Another example of the detailed map information limiting the set of possible actions may be based on the relative location of the detected object. For example, the detailed map information may be used to identify lane information of the detected object. For instance, referring to FIG. 6, the detailed map information may indicate that the detected object is in turn-only lane 592 or 594 (not shown). Based on the detected object being in a turn-only lane, the one or more computing devices may eliminate any possible actions that do not involve the vehicle making the turn indicated by the turn-only lane.

Additionally, the detailed map information may also be used to eliminate possible actions based on the detected object's proximity to landmarks, such as the intersection 502 and stop sign 505 in FIG. 6. For example, the detailed map information may be used to determine the vehicle 580's distance to the intersection 502. Accordingly, the vehicle 580's distance to the intersection 502 and traffic information about the intersection 502, such as the stop sign 505, may be used to determine a set of possible actions available to the vehicle 580. For example, as the vehicle 580 approaches the intersection 502, the options available to the vehicle 580 may include stopping before taking further action, such as turning right, turning left, or continuing straight. Based on the presence of the stop sign 505, the one or more computing devices of the vehicle 100 may eliminate possible actions where the vehicle 580 does not stop at the stop sign 505.

Referring to FIG. 6, when generating the set of possible actions, the one or more computing devices may refer to the detailed map information and contextual information to determine the set of possible actions. In this regard, the one or more computing devices may eliminate actions, such as turning into the turn-only lanes 592 and 594, from the set of possible actions for vehicle 580. Other examples (not shown) may include the one or more computing devices eliminating illegal actions, such as turning the wrong way down a one-way road or driving on the shoulder to an exit ramp.

Additionally, the map information and contextual information may be used to limit or add actions to the set of possible actions. For example, the map information or contextual information may indicate a temporary construction blocking a lane. In this regard, the temporary construction may limit the set of possible actions for the vehicle 100. Additionally, the contextual information may detect a person directing traffic through a construction zone. In this regard, the person directing traffic may be directing vehicles in to an oncoming lane to navigate around the construction. The one or more computing devices may add a new action (i.e., driving in the oncoming lane) to the set of possible actions.

In addition, the one or more computing devices may reduce or limit the set of possible actions for each detected object using kinematic or dynamic models of feasible behavior for the detected object. For instance, the capabilities of a typical passenger vehicle would limit certain maneuvers. In this regard, a vehicle traveling in one direction at 25 MPH could not immediately change its heading as to be traveling 25 MPH in the reverse direction in the next instant. Referring to FIG. 6, if stop sign 505 did not exist and the vehicle 580 was traveling at 25 MPH, action 675 could be eliminated as a possible action. In another example, a vehicle that is stopped will not be moving 50 mph in the next instant.

Based on the generated set of possible actions, the vehicle's one or more computing devices may generate a set of possible future trajectories. Each future trajectory may include a path including a set of locations, headings, speeds, accelerations or decelerations, and curvature that the detected object could take for a given actions in the set of possible actions. Curvature is a rate of change in the heading over an arc length. In this regard, curvature may indicate the turning radius of a vehicle, which affects the position and heading of the vehicle. The set of future trajectories may be based upon the detailed map information, past trajectories, contextual information and speeds. Given that more than one trajectory could be determined for each possible action, each action may therefore be associated with one or more trajectories.

Figure 7A:
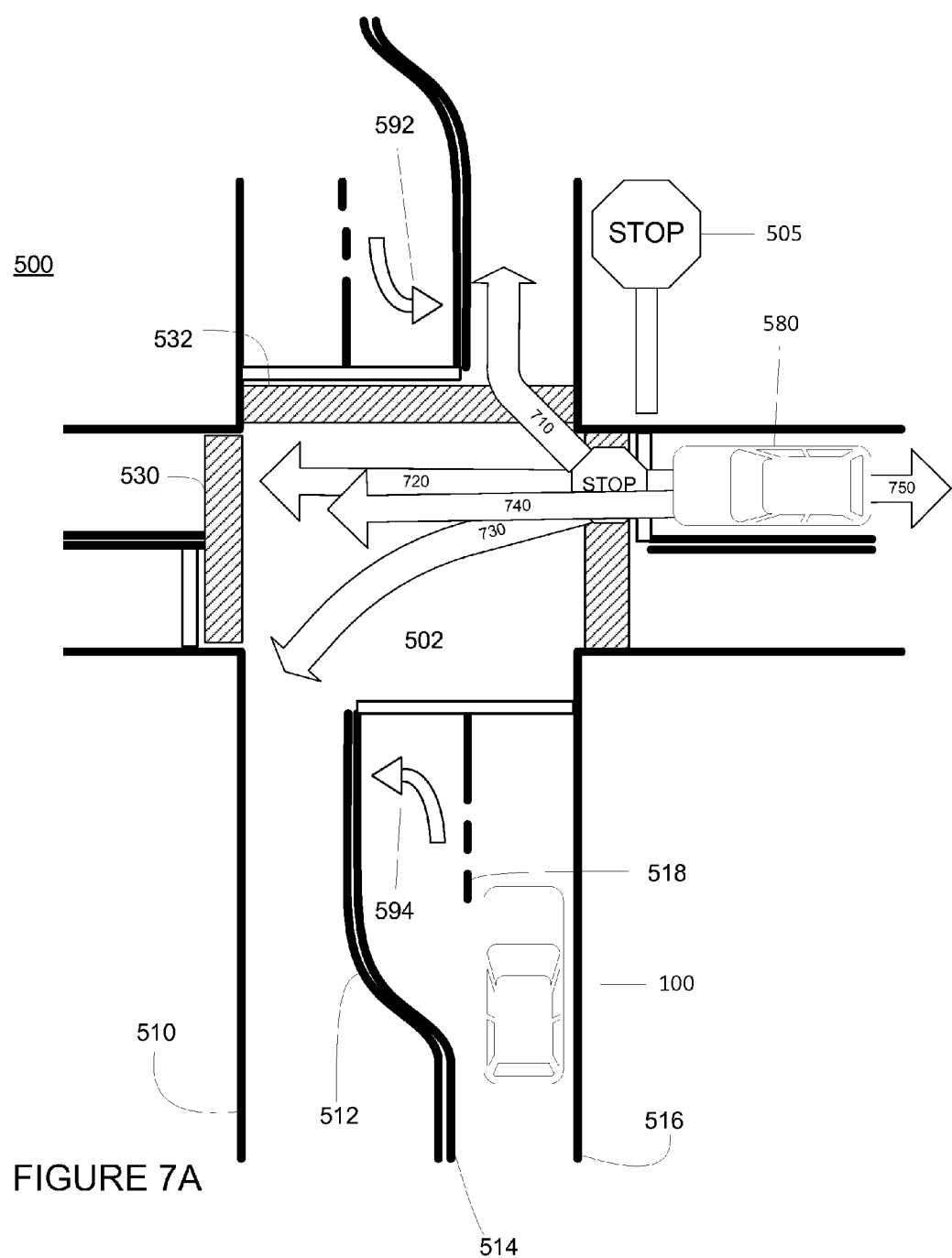
FIGS. 7A-7C are examples of predicting a possible set of trajectories and maneuvering to avoid those trajectories in accordance with aspects of the disclosure.

Turning to FIG. 7A, the one or more computing devices may generate a future trajectory for each of the set of possible actions generated in FIG. 6. As shown in FIG. 7A, there are several trajectories shown (i.e. 710, 720, 730, 740, 750). For example, trajectory 710 corresponds to action 671 and includes the vehicle stopping at the stop sign 505 before turning right at the intersection 502 based on the action 671 in FIG. 6. Trajectory 720, which corresponds to action 672, includes the vehicle may stop at the stop sign 505 before going straight through intersection 502. The trajectory 730 corresponds to action 673 and includes the vehicle stopping at the stop sign 505 and then turning left at intersection 502. The trajectory 740 corresponds to action 672 and includes the vehicle 580 ignoring the stop sign 505 and proceeding through the intersection 502 without stopping. In this regard, the trajectory 740 is also related to the action 672. Finally, the trajectory 750 corresponds to action 675 and includes the vehicle 580 going in reverse. As noted above, this action may be eliminated prior to generation of the future trajectories. According to some examples, the trajectory 750 may not be generated.

Figure 7B:
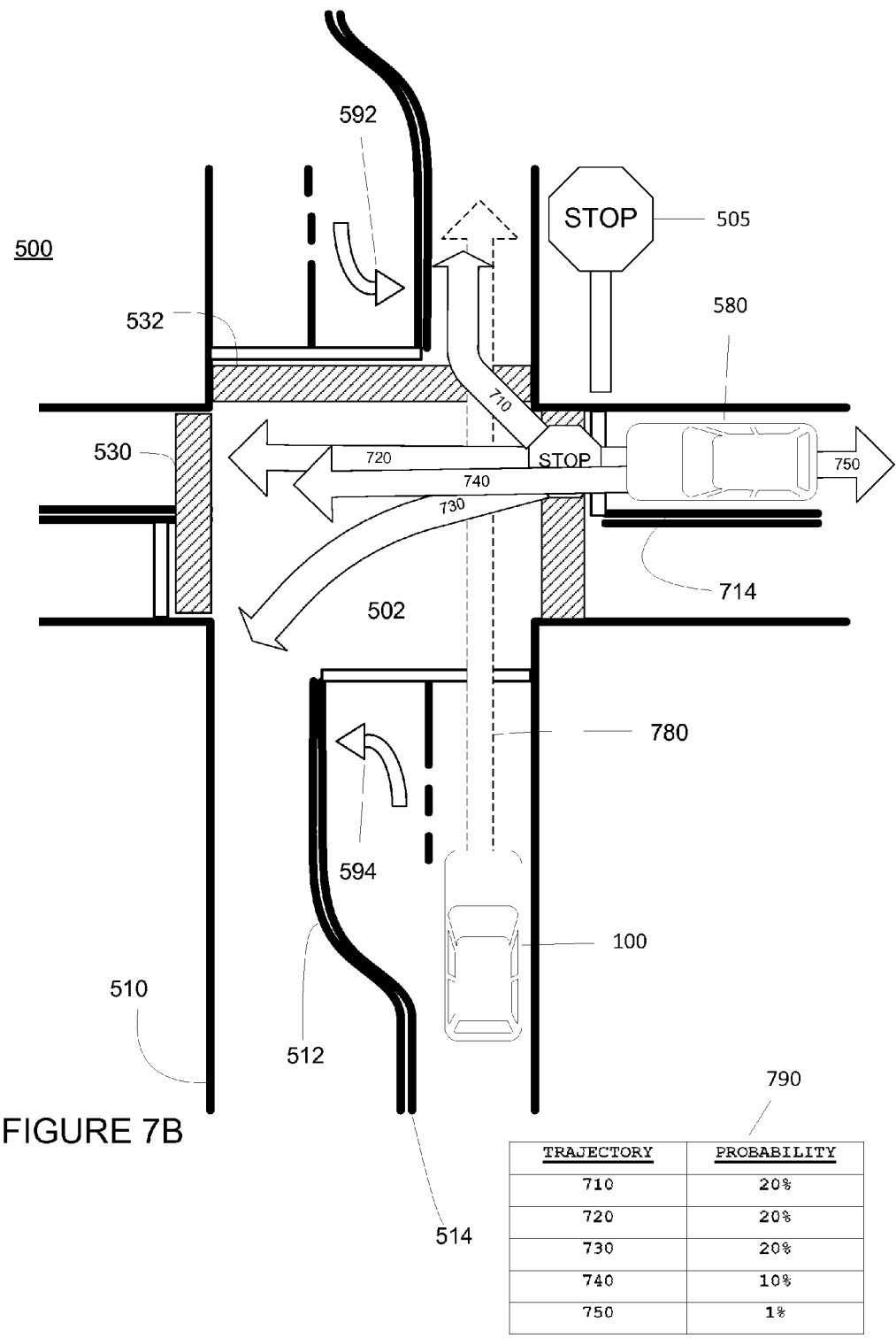

The set of future trajectories may also be based upon the detailed map information For example, when generating a trajectory for the left turn action 673 (from FIG. 6), the one or more computing devices may refer to the detailed map information for the intersection to generate the trajectory 730 shown in FIGS. 7A and 7B. Accordingly, the trajectory 730 may start from the current vehicle location and heading and turn smoothly, tracking the shape of the left turn information stored in the detailed map information.

The one or more computing devices may use the detailed map information to determine where the detected object is likely to stop when generating possible trajectories. For example, when determining trajectories related to stopping for traffic lights, at stop signs, or yielding to oncoming traffic, the one or more computing devices may refer to the detailed map information to determine a location of a stop line or where lanes overlap. Accordingly, the generated trajectory may stop at a stopping point indicated in the detailed map information.

In some examples, contextual information of other detected objects may be used to generate the set of future trajectories. For example, other objects may block, or otherwise, obstruct one or more of the set of possible actions of the detected object. The one or more computing devices may factor in the blocking or obstructing object when determining a trajectory for the action. Accordingly, the one or more computing devices may generate a trajectory for the action that includes stopping or slowing down to account for the other objects blocking the way of the detected objects. Further examples include generating trajectories that nudge (i.e., maneuver around) other detected objects. For example, the one or more computing devices may generate a trajectory for a bicyclist that swerves around a parked car blocking the bike lane. Further examples include generating a trajectory for a detected object that may be performing a U-turn. The one or more vehicle computing devices may use the curvature of the turn to determine how fast the U-turn may be formed. For example, a vehicle cannot perform a U-turn at a speed of 35 MPH or greater. Thus, the U-turn trajectory may limit the speed of the detected object to less than 35 MPH.

After determining one or more future trajectories for each of the possible actions in the set of possible actions, the one or more computing devices may calculate a weight or probability (e.g., likelihood value) of each future trajectory based upon the contextual information. As an example, vehicle's one or more computing devices may use a machine learning classifier to determine a likelihood value for each trajectory for the detected object based on the future trajectories and the contextual information. Accordingly, the classifier may output a value indicating the likelihood value for each of the potential future trajectories. The classifier may be trained on data recorded by sensors which have captured information about how objects in the environment are likely to act at different locations at different times. In some examples, the classifier may learn from processing data about different objects in a variety of different settings. The one or more computing devices may regularly (i.e., multiple times a second) update the weights or probabilities associated with each of the future trajectories up until the tracked object commits to one of the predicted trajectories (e.g., running a red light or making a turn).

Turning to FIG. 7B, the table 790 shows a likelihood value associated with each of the future trajectories 710, 720, 730, 740, and 750 of FIG. 7A. In this example, the trajectory 710 may have a likelihood value of 20%; the trajectory 720 may have a likelihood value of 20%, the trajectory 730 may have a likelihood value of 20%; the trajectory 740 may have a likelihood value of 10%; the trajectory 750 may have a likelihood value of 1%. These values are merely illustrative and other values may be assigned to the trajectories as described above.

In the example of FIGS. 7A and 7B, the contextual information may indicate that the vehicle 580 did not activate a turn signal. Thus, the future trajectory 720's likelihood value is 20% as other vehicles approaching stop signs or intersections with similar physical characteristics without turn signals typically proceeded straight through the intersection after stopping. In this regard, the likelihood values of future trajectory 720 may be somewhat less if the vehicle 580 were to have activated a turn signal.

As another example, the future trajectories 710 and 730 each have a likelihood value of 20% because in at least some cases, vehicles that approached a stop sign with activating a turn signal did in fact make left or right turns at the same rate. In this regard, the likelihood values of future trajectory 710 or future trajectory 730 may be greater if the vehicle 580 were to have activated a turn signal. Similarly, if the vehicle 580 changes heading and moves closer to the double-line 514, the one or more computing devices may determine that there is a greater likelihood of the vehicle 580 making a left turn and thus, the likelihood value for future trajectory 730 may be increased.

In a further example, the future trajectory 740 has a likelihood value of 10% because in at least some cases, vehicles approaching stop signs without turn signals rolled into an intersection without stopping. Finally, the future trajectory 750 has a likelihood value of 1% indicating that it is very unlikely that the vehicle 580 would reverse down the road as very few or no other vehicles at stop signs performed an illegal action and reverse down a road in the wrong direction.

After computing the likelihood values for each of the future trajectories of the detected object, the one or more computing devices may determine a final future trajectory for the detected object. In order to do so, a threshold value may be used to discard or filter unlikely trajectories from the set of possible future trajectories. As an example, if the threshold value is 15% or 0.15 trajectories with a probability of less than 15% or 0.15 may be discarded or filtered. Turning to FIG. 7B, using the example of a threshold value of 15%, the future trajectories 740 and 750, with likelihood values of 10% and 1%, respectively, may be discarded by the one or more computing devices.

If any future trajectories remain in the set of possible future trajectories after any trajectories that do not meet the threshold value are discarded or filtered, the one or more computing devices may select the future trajectory with the highest likelihood value as the final future trajectory as discussed in greater detail with respect to FIG. 8. In other examples, the future trajectories 710, 720, and 730 may all be considered by the one or more computing devices in determining a route for the vehicle.

The final future trajectory may also be determined based upon the relationship between the location of the vehicle and the objects detected in the vehicle's environment. When such situational relationships are identified, a second threshold may be used to eliminate additional trajectories of the set of trajectories. The remaining trajectories may then all be treated as the final future trajectory.

One example of a situational relationship is a path crossing. Crossing the vehicle's path may include, for example, vehicles travelling perpendicular to the vehicle 100 or making a left turn in the vehicle 100's path. In the context of highways, crossing the vehicle 100's path may include lane changes. Because of the dangers involved in a path crossing, the vehicle's one or more computers may use a second threshold and take into consideration multiple trajectories that are likely to occur. In one instance, the one or more computing devices may identify a situational relationship between the vehicle 100 and future trajectories of vehicle 580 in that multiple of the future trajectories indicate that vehicle 580 is likely to cross the path of the vehicle 100. Thus, trajectories in the set of trajectories (that have not already been eliminated) may be compared to a second threshold value. As an example, if this second threshold value is 20%, The remaining trajectories (i.e. 710, 720, and 730) may be compared to the second threshold since the future trajectories 710, 720, and 730 are equal to or greater than the likelihood value of 20%. The one or more computing devices may consider all three remaining trajectories in determining the final future trajectory of the vehicle 580.

Another example of a situational relationship may be based on the relative location of a pedestrian who is crossing a roadway proximate to the vehicle. For example, where a pedestrian is crossing a roadway in a crosswalk, a single trajectory may be appropriate for the final future trajectory. However, if the pedestrian is not crossing in a crosswalk, again given the dangers involved, the vehicle's one or more computers may use a second threshold and take into consideration multiple trajectories that are likely to occur. As another example, if the crosswalk includes a median or sidewalk portion where a pedestrian can stop and wait between lanes of a roadway, this may be another situational relationship where the vehicle's one or more computers may use a second threshold to take into consideration multiple trajectories.

Another example of a situational relationship may include another object located in a two-way left-turn lane, commonly called a suicide lane, where traffic from either direction on a roadway may enter to make a left turn. Because these left turns may be made by a vehicle at various points along a two-way left-turn lane, vehicle 100's one or more computing devices may use a second threshold to take into consideration multiple trajectories of other vehicles in such two-way left-turn lanes. This may be the case even where the other vehicle is not necessarily crossing the path of vehicle 100, such as where vehicle 100 is also located in the two-way left-turn lane and moving in the same or the opposite direction of traffic as the vehicle.

If no trajectories remain after eliminating trajectories from the set of trajectories as described above, then the set of future trajectories may be further analyzed to determine a final future trajectory. In one example, the vehicle's computing devices may determine commonly occurring points or locations between the trajectories. The most commonly occurring locations may be strung together into a new trajectory and identified as the final future trajectory. For example, if the threshold is 15% and each possible trajectory of a set has a likelihood value of less than 15%, all of the trajectories would fall below the threshold value. If at least some of the trajectories include the detected object moving forward in the same general direction, then the common portions of these trajectories may be strung together and identified as the final future trajectory.

The vehicle's one or more computing devices may determine a final future trajectory (or most likely trajectories) of the detected object using waypoints. For instance, each trajectory may include a number of waypoints determined by the vehicle's one or more computing devices. A waypoint may define a position or location and velocity of the detected object along a trajectory at a given time. Thus, each waypoint may include a projected future position or location of the detected object, a projected future velocity of the detected object, and a time or timestamp for the waypoint. Waypoints may also be determined for a projected future location of vehicle 100's. This may be used to determine whether any waypoints of vehicle 100 and the waypoints of the set of trajectories are within a predetermined distance of one another.

Figure 7C:
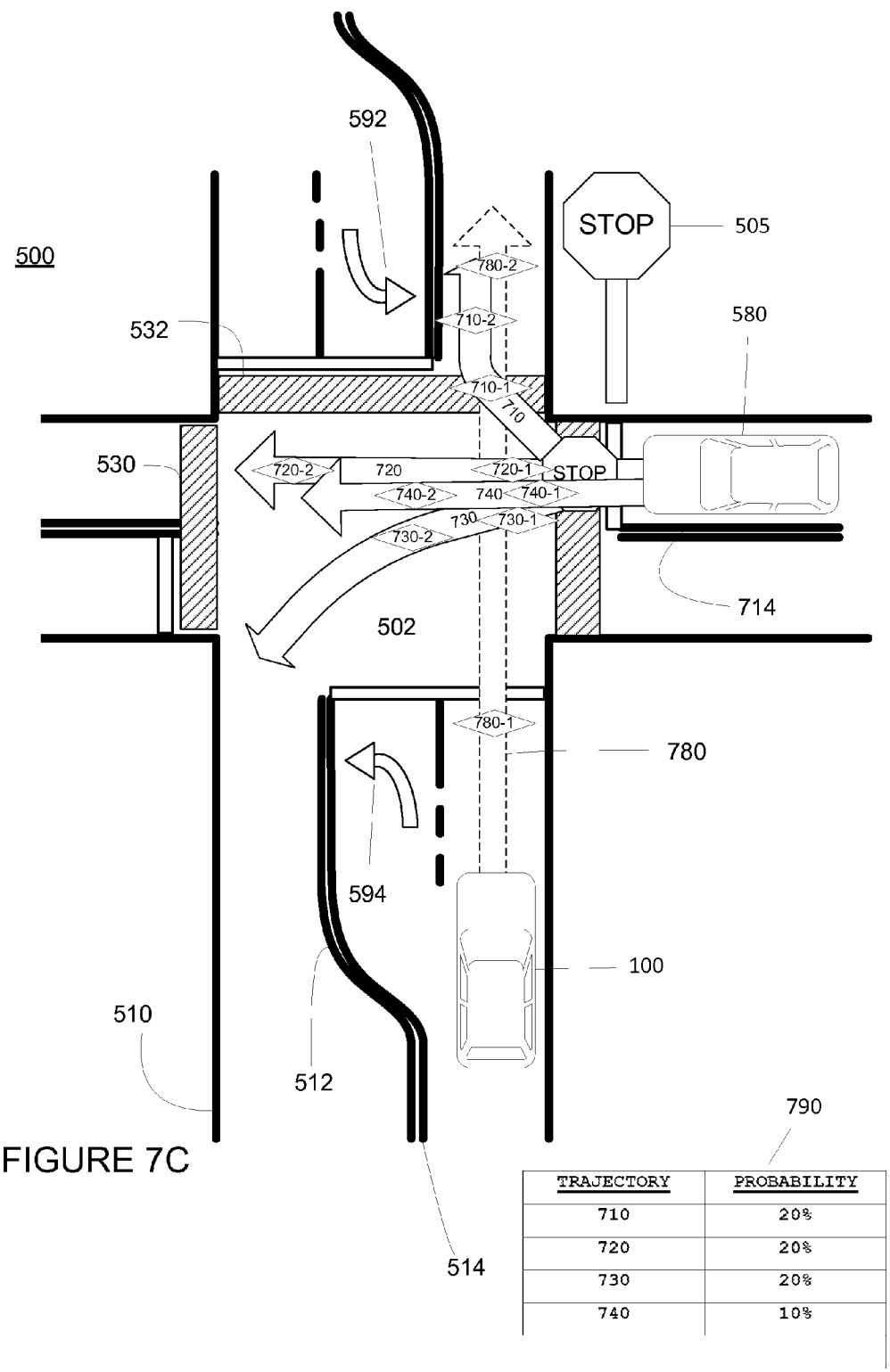

Referring to FIG. 7C, the set of possible future trajectories for vehicle 580 includes trajectories 710, 720, 730, and 740. The probability of the trajectory 710 is 20%, the probability of the trajectory 720 is 20%, the probability of the trajectory 730 is 20%, and the probability of the trajectory 740 is 10%. In this example, the threshold value may be set at a probability of 30%. Thus, the trajectories 710, 720, 730, and 740 would not meet the threshold value and would typically all be filtered from the set of possible future trajectories.

As noted above, the one or more computing devices of the vehicle 100 may determine waypoints for each of the trajectories 710, 720, 730, and 740. As shown in FIG. 7C, the trajectory 710 may include waypoint 710-1 and waypoint 710-2; the trajectory 720 may include waypoint 720-1 and waypoint 720-2; the trajectory 730 may include waypoint 730-1 and waypoint 730-2; and the trajectory 740 may include waypoint 740-1 and waypoint 740-2. As discussed above, each waypoint may define a future position, velocity, and time for the vehicle 580. Referring to FIG. 7C, each -1 and -2 corresponds to the same timestamp. Although only a few waypoints are depicted for clarity, each trajectory may include any number of waypoints depending on the length of the future trajectory in time (in other words how far out the prediction goes) and the difference in time between each waypoint.

In one example, the one or more computing devices of vehicle 100 may determine whether any of the waypoints are within a predetermined distance of each other at a predetermined time. If so, these trajectories may be used to determine a final future trajectory by summing their probabilities and comparing that sum to the threshold value. As an example, a predetermined distance may be between about 2 meters and about 6 meters.

Referring to FIG. 7C, the one or more computing devices may identify any waypoints that are within a predetermined distance of one another, such as 5.5 or more or less meters, at any of the timestamps. For example, at the timestamp T=1, the waypoint 720-1, waypoint 730-1, and waypoint 740-1 may be within the predetermined distance of one another, while waypoint 710-1 is not within 5.5 meters of any other waypoint. The one or more computing devices of the vehicle 100 may determine a sum of the probabilities for the trajectory 720, the trajectory 730, and the trajectory 740. Further, the one or more computing devices of the vehicle 100 may also add the probability for the trajectory 710 with any of the trajectories that are within the predetermined distance of the waypoint 710-1 at timestamp T=1. However, since none of the trajectories shown in FIG. 7C are within the predetermined distance of waypoint 710-1, the probability associated with the trajectory 710 is not combined with the probabilities for trajectory 720, trajectory 730, and trajectory 740.

The sum of the probabilities may be compared to the threshold value. If the sum of the probabilities meets the threshold value, then the one or more computing devices may determine that the trajectory 720, the trajectory 730, and the trajectory 740 are together a final future trajectory. In this regard, each of these trajectories may be considered a final future trajectory of the vehicle 580.

In another example, the waypoints may be used to determine the final future trajectory based on whether any of the waypoints of a projected future path of vehicle 100 are within a predetermined distance of one of the waypoints of a possible future trajectory of a detected object. If so, these trajectories may be used to determine one or more final future trajectories of the detected object.

For example, the one or more computing devices may determine that the path 780 of the vehicle 100 includes waypoint 780-1 and waypoint 780-2. The one or more computing devices may compare the waypoints of path 780 to the waypoints of the trajectories of the set of possible future trajectories (710, 720, 730, and 740) at various timestamps. If a waypoint of the path 780 for a particular timestamp are within a predetermined distance of a given waypoint with the same particular timestamp of any of the set of possible future trajectories, 710, 720, 730, and 740, then the one or more computing devices may identify the possible future trajectory associated with the given waypoint as the final future trajectory for the object.

For example, in FIG. 7C, at timestamp T=1, the one or more computing devices may compare waypoint 780-1 (of timestamp T=1) to the waypoints of the set of possible future trajectories corresponding to timestamp T=1, here, waypoint 710-1, waypoint 720-1, waypoint 730-1, and waypoint 740-1 to determine whether the waypoint 780-1 is within a predetermined distance (e.g., 5.5 meters) of any of waypoint 710-1, waypoint 720-1, waypoint 730-1, and waypoint 740-1. According to FIG. 7C, the one or more computing devices may determine that waypoint 710-1, waypoint 720-1, waypoint 730-1, and waypoint 740-1 are not within a predetermined distance of the waypoint 780-1. Therefore, waypoint 710-1, waypoint 720-1, waypoint 730-1, and waypoint 740-1 may not be used to determine the final future trajectory at timestamp T=1. Accordingly, the one or more computing devices may use the sum of probabilities as described above to determine the final future trajectory (trajectories) at timestamp T=1.

For timestamp T=2, the one or more computing devices may compare waypoint 780-2 to waypoint 710-2, waypoint 720-2, waypoint 730-2, and waypoint 740-2 to determine whether 710-2, waypoint 720-2, waypoint 730-2, and waypoint 740-2 are within a predetermined distance of waypoint 780-2. In this regard, the one or more computing devices may determine that waypoint 710-2 is within the predetermined distance of waypoint 780-2 at timestamp T=2. Furthermore, the one or more computing devices may determine that that waypoint 720-2, waypoint 730-2, and 740-2 are not within the predetermined distance of waypoint 780-2. Therefore, waypoint 720-1, waypoint 730-1, and waypoint 740-1 may not be used to determine the final future trajectory at timestamp T=1. The one or more computing devices may determine trajectory 710 as the final future trajectory for the timestamp T=2 since waypoint 710-2 is within the predetermined distance of waypoint 780-2 at timestamp T=2.

After determining the final future trajectory (or trajectories), the one or more computing devices of the vehicle 100 may determine how to maneuver the vehicle 100. For example, the one or more computing devices may determine a route that avoids the final future trajectory of the detected object. Accordingly, the one or more computing devices may maneuver the vehicle 100 according to the determined route such that the vehicle 100 avoids intersecting the final future trajectory of the detected object. For example, turning to FIG. 7B, assuming that the final future trajectory of vehicle 580 has vehicle 580 stopping completely at the stop sign 505 before proceeding into the intersection 502 and vehicle 100 needs to pass straight through the intersection, the vehicle's one or more computing devices may maneuver the vehicle along possible route 780 (shown in dashed line) in order to avoid the final future trajectory of vehicle 580. Of course, as the detected objects and/or vehicle 100 continue to move, the one or more computing devices may use the features described above to determine further final future trajectories of the detected objects and maneuver the vehicle 100 accordingly.

Figure 8A:
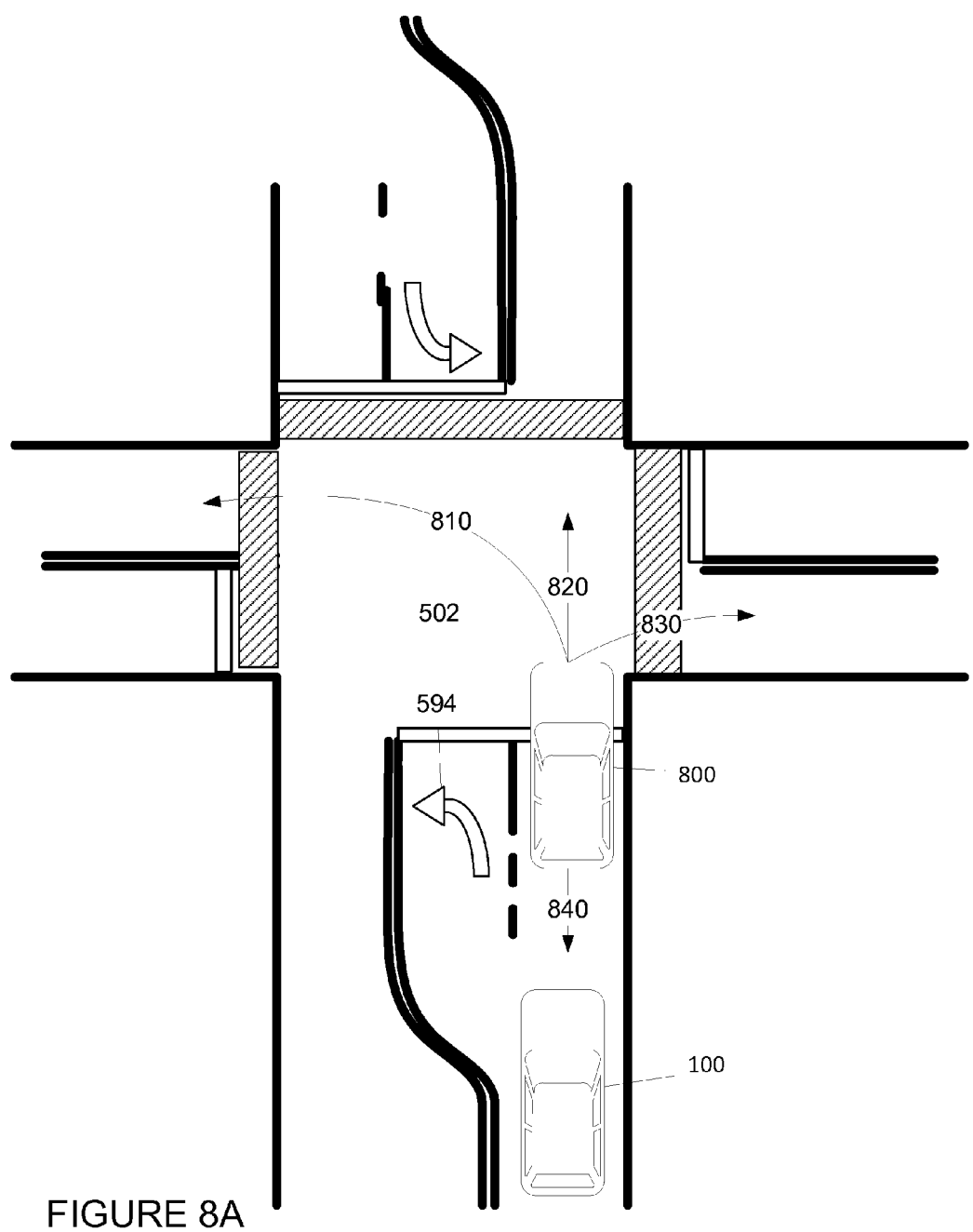
FIGS. 8A-8C are examples of generating a possible set of actions and predicting future trajectories in accordance with aspects of the disclosure.

In addition to the examples discussed above, FIGS. 8A-8C provide another example of generating a set of possible actions and a set of future trajectories for each of the actions when travelling behind a vehicle. FIG. 8A is an example of vehicle 100 approaching intersection 502. Although not otherwise indicated in FIG. 8A, the one or more computing devices of vehicle 100 may be maneuvering vehicle 100 in order to continue straight through the intersection 502 (without making a left or right turn). In this example, the vehicle 800 is directly in front of vehicle 100 and also approaching intersection 502. The one or more computing devices may receive information from the perception system 172 and/or determine various characteristics of the vehicle 800. Additionally, the perception system 172 and/or one or more computing devices may track the location of the vehicle 800 over a brief period of time in order to determine a heading and speed, plot a past trajectory (not shown), and identify contextual information. For example, the one or more computing devices may detect brake lights and a right turn signal from the vehicle 800 as the vehicle 800 approaches intersection 502.

Based on the received information, the one or more computing devices may generate a set of possible actions for the vehicle 800. For example, the vehicle 800 may take various actions, such as turning left 810, continuing straight 820, turning right 830, or travelling in reverse 840. As noted above, some actions, such as traveling in reverse, may be discarded using kinematic or dynamic models of feasible behavior for the detected object.

Figure 8B:
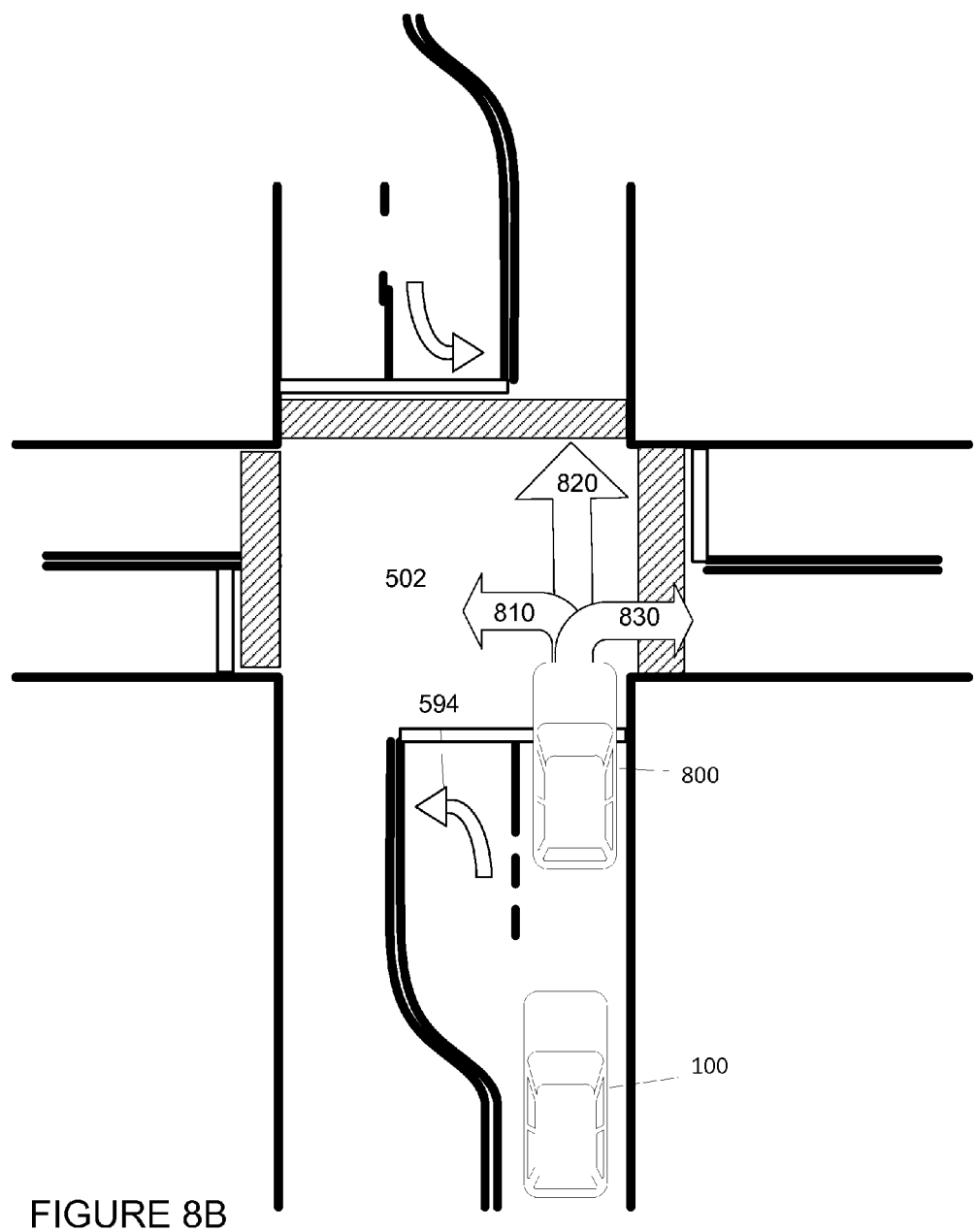

The one or more computing devices may then calculate future trajectories for each of the actions in the set of actions as shown in FIG. 8B. For example, trajectory 810 corresponds to action 810 and includes the path the vehicle 800 may take when turning left from the right lane; trajectory 820 corresponds to action 820 and includes the path the vehicle 800 may take if traveling straight through intersection 502; and trajectory 830 corresponds to the action 830 and includes the path the vehicle 800 may take by turning right at intersection 502. As previously discussed, the set of trajectories may be determined the detailed map information and the contextual information of other detected objects. After a set of possible trajectories have been determined, the one or more computing devices may calculate a probability (i.e. likelihood value) of each trajectory.

In this example, prior to the vehicle 800 reaching the intersection 502, each of the trajectories 810, 820, and 830 may have an equal probability of occurring. However, once the vehicle 800 is within some distance of the intersection 502, these probabilities may begin to change until they reach the probabilities identified in table 890 of FIG. 8C. Thus, in this example, the probability of trajectory 810 occurring may drop significantly when the vehicle 800 does not move in to the left-turn lane 594.

Figure 8C:
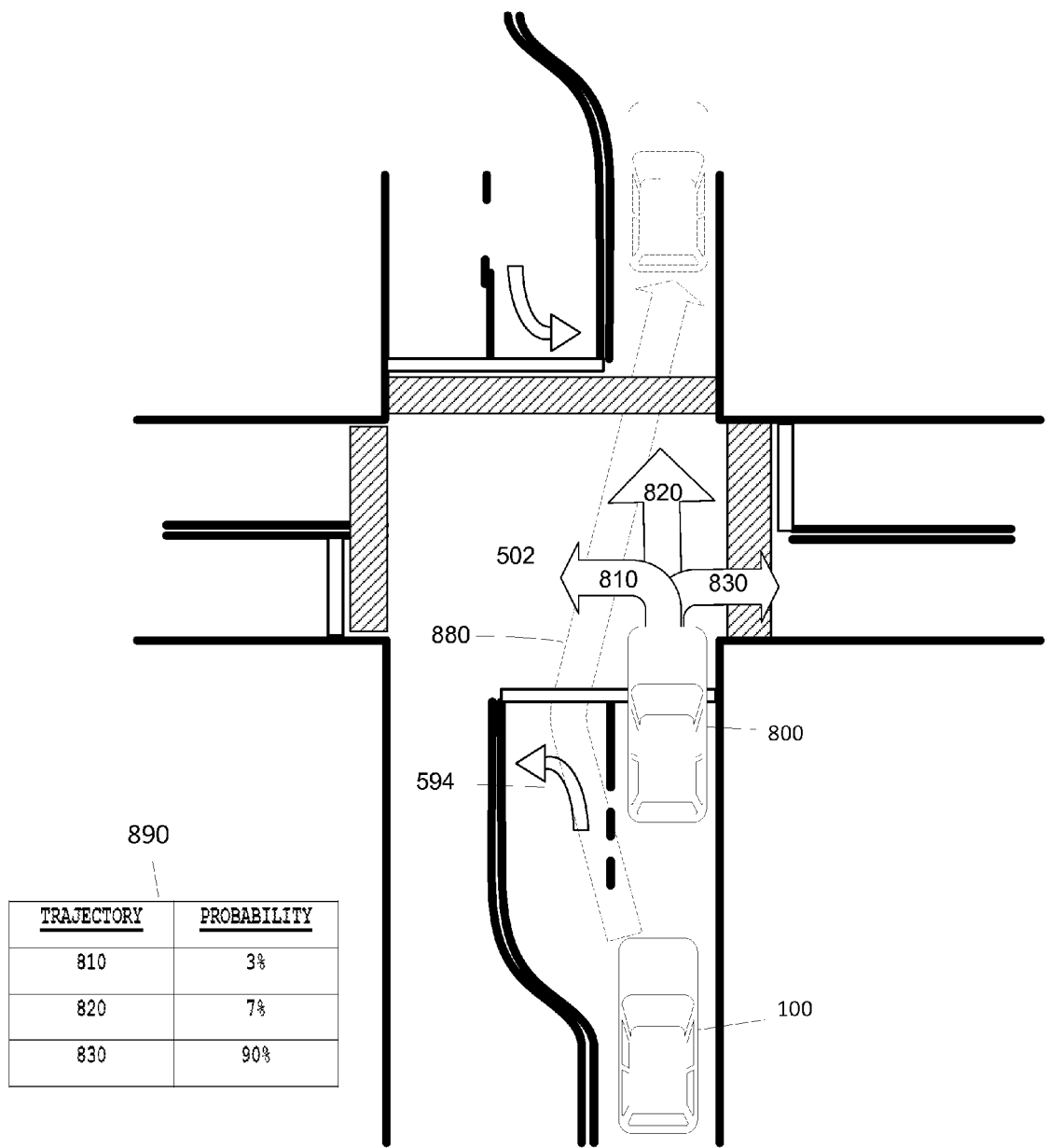

Again, based on the likelihood values, the vehicle's one or more computing devices may identify a final future trajectory. Turning to FIG. 8C, the one or more computing devices may compare the trajectories 810, 820 and 830 to a threshold value. Assuming there is no identified situational relationship between the vehicle 100 and the vehicle 800, the one or more computing devices may select the trajectory 830 as the final future trajectory based on the trajectory 830 having a 90% chance of occurring.

The final future trajectory may be provided to the one or more computing devices to determine how to maneuver the vehicle 100 in order to avoid the final future trajectory of vehicle 800 and continue through the intersection 502. Accordingly, the vehicle 100 may follow the path 880 into the left-turn only lane 594 to maneuver around the vehicle 800 to avoid the trajectory 830 and the vehicle 800. FIG. 8C also illustrates one possible route 880 (shown in dashed line) a vehicle 100 may take to avoid the future trajectories of the vehicle 800.

Figure 9:
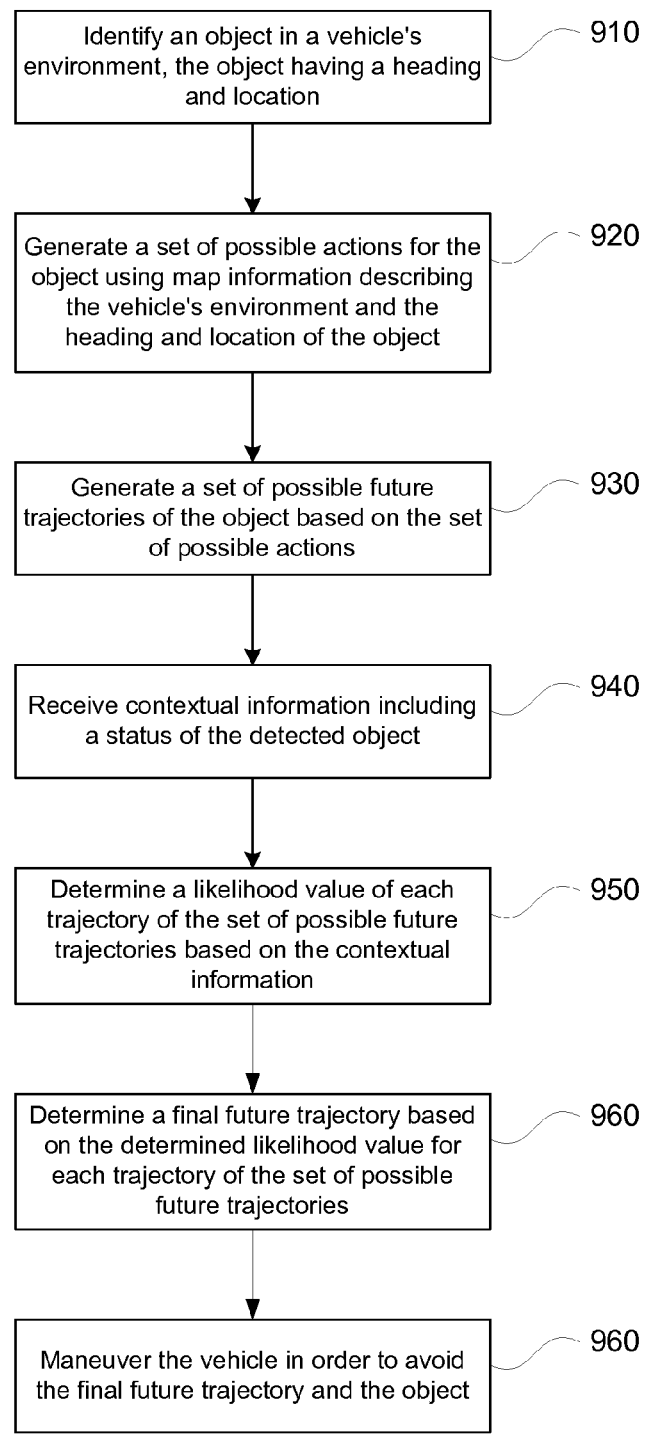
FIG. 9 is an example flow diagram in accordance with aspects of the disclosure.

FIG. 9 is an example flow diagram 900 which depicts some of the aspects described above which may be performed by one or more computing devices such as one or more computing devices 110 of vehicle 100. In this example, an object having a heading and location is identified in a vehicle's environment at block 910. A set of possible actions for the object is generated using map information describing the vehicle's environment and the heading and location of the object at block 920. A set of possible future trajectories of the object is generated based on the set of possible actions at block 930. Contextual information including a status of the detected object is received at block 940. A likelihood value of each trajectory of the set of possible future trajectories is determined based on the contextual information at block 950. A final future trajectory is determined based on the determined likelihood value for each trajectory of the set of possible future trajectories at block 960. The vehicle is then maneuvered in order to avoid the final future trajectory and the object at block 970.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer-implemented method comprising:
    identifying, by one or more computing devices, an object in a vehicle's environment, the object having a heading and location;
    generating, by the one or more computing devices, a set of possible actions for the object using map information describing the vehicle's environment and the heading and location of the object;
    generating, by the one or more computing devices, a set of possible future trajectories of the object based on the set of possible actions;
    receiving, by the one or more computing devices, contextual information including a status of the detected object;
    determining, by the one or more computing devices, a likelihood value of each trajectory of the set of possible future trajectories based on the contextual information;
    determining, by the one or more computing devices, a final future trajectory based on the determined likelihood value for each trajectory of the set of possible future trajectories; and
    maneuvering, by the one or more computing devices, the vehicle in order to avoid the final future trajectory and the object.

2. The method of claim 1, wherein determining the final future trajectory includes:
    comparing the likelihood value for each trajectory of the set of possible future trajectories to a threshold value; and
    discarding a trajectory from the set of trajectories when the likelihood value of that trajectory does not meet the threshold value, wherein the likelihood value of the discarded trajectory is not used to determine the final future trajectory.

3. The method of claim 2, wherein determining the final future trajectory includes:
    when none of the trajectories of the set of possible future trajectories meet the threshold value, identifying a plurality of waypoints for each trajectory in the set of trajectories, wherein a waypoint includes at least one of a position, a velocity, and a timestamp;
    determining a trajectory of the vehicle, wherein the trajectory of the vehicle includes a plurality of waypoints; and
    comparing, at a same timestamp, each of the waypoints to a waypoint associated with a trajectory of the vehicle in order to determine the final future trajectory.

4. The method of claim 2, wherein determining the final future trajectory includes:
    identifying a situational relationship between the object and the vehicle;
    comparing the likelihood value of the trajectories remaining in the set of possible future trajectories to a second threshold different from the first threshold value, and
    discarding a second trajectory from the trajectories remaining in the set of possible future trajectories when the likelihood value of that second trajectory does not meet the second threshold value, wherein the likelihood value of the discarded second trajectory is not used to determine the final future trajectory.

5. The method of claim 4, wherein after discarding the second trajectory, the remaining trajectories of the set of possible future trajectories are each identified as final future trajectories, such that maneuvering the vehicle includes avoiding each of the remaining trajectories of the set of possible future trajectories.

6. The method of claim 1, wherein determining the final future trajectory includes selecting a trajectory of the set of possible future trajectories with a highest likelihood value as the final future trajectory.

7. The method of claim 1, wherein generating the set of possible actions includes discarding an action from the set of possible actions for failing to comply with a model of possible actions for the object.

8. The method of claim 1, wherein generating the set of possible actions is further based on a past trajectory of the object.

9. The method of claim 1, wherein the contextual information further describes a status of a second object in the vehicle's environment.

10. A system comprising one or more computing devices configured to:
    identify an object in a vehicle's environment, the object having a heading and location;
    generate a set of possible actions for the object using map information describing the vehicle's environment and the heading and location of the object;
    generate a set of possible future trajectories of the object based on the set of possible actions;
    receive contextual information including a status of the detected object;
    determine a likelihood value of each trajectory of the set of possible future trajectories based on the contextual information;
    determine a final future trajectory based on the determined likelihood value for each trajectory of the set of possible future trajectories; and
    maneuver the vehicle in order to avoid the final future trajectory and the object.

11. The system of claim 10, wherein the one or more computing devices are further configured to determine the final future trajectory by:
    comparing the likelihood value for each trajectory of the set of possible future trajectories to a threshold value; and discarding a trajectory from the set of trajectories when the likelihood value of that trajectory does not meet the threshold value, wherein the likelihood value of the discarded trajectory is not used to determine the final future trajectory.

12. The system of claim 11, wherein the one or more computing devices are further configured to determine the final future trajectory by:
when none of the trajectories of the set of possible future trajectories meet the threshold value, identifying a plurality of waypoints for each trajectory in the set of trajectories, wherein a waypoint includes at least one of a position, a velocity, and a timestamp;
determining a trajectory of the vehicle, wherein the trajectory of the vehicle includes a plurality of waypoints; and
comparing, at a same timestamp, each of the waypoints for each trajectory to a waypoint of the trajectory of the vehicle to determine the final future trajectory.

13. The system of claim 11, wherein the one or more computing devices are further configured to determine the final future trajectory by:
identifying a situational relationship between the object and the vehicle;
comparing the likelihood value of the trajectories remaining in the set of possible future trajectories to a second threshold different from the first threshold value, and
discarding a second trajectory from the trajectories remaining in the set of possible future trajectories when the likelihood value of that second trajectory does not meet the second threshold value, wherein the likelihood value of the discarded second trajectory is not used to determine the final future trajectory.

14. The system of claim 13, wherein the one or more computing devices are further configured to, after discarding the second trajectory, identify the remaining trajectories of the set of possible future trajectories as each being final future trajectories, such that maneuvering the vehicle includes avoiding each of the remaining trajectories of the set of possible future trajectories.

15. The system of claim 10, wherein the one or more computing devices are further configured to determine the final future trajectory by selecting a trajectory of the set of possible future trajectories with a highest likelihood value as the final future trajectory.

16. The system of claim 10, wherein the one or more computing devices are further configured to determine the final future trajectory by discarding an action from the set of possible actions for failing to comply with a model of possible actions for the object.

17. The system of claim 10, wherein the one or more computing devices are further configured to generate the set of possible actions further based on a past trajectory of the object.

18. The system of claim 10, wherein the contextual information further describes a status of a second object in the vehicle's environment.

19. The system of claim 10, wherein the vehicle is an autonomous vehicle.

20. A non-transitory computer-readable medium on which instructions are stored, the instructions, when executed by one or more processors cause the one or more processors to perform a method, the method comprising:
identifying an object in a vehicle's environment, the object having a heading and location;
generating a set of possible actions for the object using map information describing the vehicle's environment and the heading and location of the object;
generating a set of possible future trajectories of the object based on the set of possible actions;
receiving contextual information including a status of the detected object;
determining a likelihood value of each trajectory of the set of possible future trajectories based on the contextual information;
determining a final future trajectory based on the determined likelihood value for each trajectory of the set of possible future trajectories; and
maneuvering the vehicle in order to avoid the final future trajectory and the object.

* * * * *